(12) United States Patent
Høyer

(10) Patent No.: US 10,748,692 B2
(45) Date of Patent: Aug. 18, 2020

(54) MAGNET APPARATUS FOR GENERATING HIGH GRADIENT MAGNETIC FIELD

(71) Applicant: Giamag Technologies AS, Kjeller (NO)

(72) Inventor: Henrik Høyer, Lillestrøm (NO)

(73) Assignee: Giamag Technologies AS, Kjeller (NO)

( * ) Notice: Subject to any disclaimer, the term of this patent is extended or adjusted under 35 U.S.C. 154(b) by 0 days.

(21) Appl. No.: 15/769,247

(22) PCT Filed: Oct. 19, 2016

(86) PCT No.: PCT/EP2016/075055
§ 371 (c)(1),
(2) Date: Apr. 18, 2018

(87) PCT Pub. No.: WO2017/067967
PCT Pub. Date: Apr. 27, 2017

(65) Prior Publication Data
US 2018/0315532 A1 Nov. 1, 2018

(30) Foreign Application Priority Data

Oct. 19, 2015 (GB) .................................. 1518430.2

(51) Int. Cl.
*H01F 7/02* (2006.01)
*B03C 1/033* (2006.01)
(Continued)

(52) U.S. Cl.
CPC ............... *H01F 7/20* (2013.01); *B03C 1/002* (2013.01); *B03C 1/0332* (2013.01);
(Continued)

(58) Field of Classification Search
CPC ......... B03C 1/002; B03C 1/025; B03C 1/029; B03C 1/03; B03C 1/031; B03C 1/033;
(Continued)

(56) References Cited

U.S. PATENT DOCUMENTS 4,704,139 A 11/1987 Yamamoto et al.
5,897,783 A 4/1999 Howe et al.
(Continued)

FOREIGN PATENT DOCUMENTS

CN 1755387 A 4/2006
DE 202010010105 U1 10/2010
(Continued)

OTHER PUBLICATIONS

Skjeltorp et al., New forceful magnetic bioseparation using GIAMAG magnet systems, 2017, Materials Research Society, MRS Advances, pp. 1297-1301 (Year: 2017).*

(Continued)

*Primary Examiner* — David C Mellon
(74) *Attorney, Agent, or Firm* — Christopher & Weisberg, P.A.

(57) ABSTRACT

A magnet apparatus for generating a high gradient and/or high strength magnetic field, comprises: two main permanent magnets 2, 4 located side-by-side with oppositely oriented magnetic field polarities and end surfaces of opposite polarities next to one another, wherein the magnetic anisotropy of the magnets 2, 4 exceeds the magnetic induction of the material of the magnets 2, 4; and at least one mask 6 on a first end of each of the adjacent permanent magnets 2, 4, the masks 6 comprising a permanent magnet material covering adjacent end surfaces of the two permanent magnets 2, 4 with a gap 8 in the masks along a joining line between the two permanent magnets 2, 4 to form a zone of high-gradient magnetic field above the joining line; wherein the permanent magnet of each mask 6 is oriented with an opposite polarity to the main permanent magnet 2, 4 that it is attached to.

28 Claims, 23 Drawing Sheets

(51) Int. Cl.
*F16C 32/04* (2006.01)
*B03C 1/00* (2006.01)
*H01F 7/20* (2006.01)

(52) U.S. Cl.
CPC ...... *F16C 32/0425* (2013.01); *F16C 32/0431* (2013.01); *B03C 2201/22* (2013.01)

(58) Field of Classification Search
CPC ... B03C 1/0332; B03C 1/034; B03C 1/03528; B03C 1/288; B03C 2201/18; B03C 2201/20; B03C 2201/22; H01F 7/02; H01F 7/0205; H01F 7/021; H01F 7/0231; H01F 7/0273; H01F 7/0278; H01F 7/0294; F16C 32/0431; F16C 32/0425; F16C 32/0423; F16C 32/0427; F16C 32/0406; F16C 32/0408
See application file for complete search history.

(56) References Cited

U.S. PATENT DOCUMENTS

| | | | |
|---|---|---|---|
| 2007/0182517 A1* | 8/2007 | Humphries | H01F 7/0252 335/306 |
| 2010/0012591 A1* | 1/2010 | Glebov | B03C 1/0332 210/695 |
| 2016/0104561 A1* | 4/2016 | Noh | H01F 7/021 335/296 |
| 2016/0108957 A1* | 4/2016 | Helgesen | F16C 32/0425 310/90.5 |
| 2017/0259277 A1* | 9/2017 | Hoyer | B03C 1/0332 |

FOREIGN PATENT DOCUMENTS

| | | | |
|---|---|---|---|
| EP | 0589636 A1 | | 3/1994 |
| EP | 1842596 A1 | | 10/2007 |
| GB | 2097096 A | | 10/1982 |
| GB | 1421078.5 | | 1/2015 |
| SU | 526388 A1 | * | 8/1976 |
| WO | 2014001332 A1 | | 1/2014 |
| WO | 2014001334 A1 | | 1/2014 |
| WO | 2014191323 A1 | | 12/2014 |

OTHER PUBLICATIONS

English language translation of SU 526388 A1, pp. 1-5. (Year: 2012).*
International Search Report and Written Opinion dated Feb. 1, 2017, for corresponding International Application No. PCT/EP2016/075055; International Filing Date: Oct. 19, 2016, consisting of 10-pages.
IPO Search Report dated Jan. 7, 2016, for corresponding Application No. GB15184302; Filing Date: Oct. 19, 2015, consisting of 4-pages.
Inge Buanes Roth, Master's Thesis, "Characterization and use of permanent magnets with extremely strong field gradients," May 24, 2009.
Chinese Office Action dated May 8, 2019 for corresponding Chinese Application No. 201680066967.7 filed on Oct. 19, 2016, consisting of 12-pages.

* cited by examiner

MAGNET APPARATUS FOR GENERATING HIGH GRADIENT MAGNETIC FIELD

CROSS-REFERENCE TO RELATED APPLICATIONS

This application is a Submission Under 35 U.S.C. § 371 for U.S. National Stage Patent Application of International Application No.: PCT/EP2016/075055, filed Oct. 19, 2016 entitled "MAGNET APPARATUS FOR GENERATING HIGH GRADIENT MAGNETIC FIELD," which claims priority to Great Britain Patent Application No.: 1518430.2, filed Oct. 19, 2015, the entirety of both which are incorporated herein by reference.

The current invention relates to a magnet apparatus for generating a high gradient and/or a high strength magnetic field and in some examples for separation of particles.

Magnetic devices are used in various industries, and different applications require different characteristics for the magnetic field. In a number of instances it is an advantage to provide a magnet apparatus that generates a high gradient magnetic field. One advantageous use of a high gradient magnetic field is for separation of particles, and in particular particles of materials that have differing paramagnetic and/or diamagnetic properties. Another advantageous use of a high gradient magnetic field is for magnetic bearings, where the magnetic forces are used to allow for a rotating or sliding movement of one mechanical part relative to another, without direct contact of the parts.

US 2010/0012591 discloses a prior art magnet apparatus for separation of paramagnetic and diamagnetic substances. The apparatus uses a Kittel open domain type magnetic structure with two rectangular permanent magnets placed side-by-side with magnetic field polarities that are oppositely directed. The magnets are mounted on a common base comprising a plate made of a non-retentive material. The base mates with the lower faces of the magnets. The apparatus also includes thin plates made of a non-retentive material, which are placed on the top faces of the magnets with a small gap arranged along the top of the join between the magnets. This apparatus provided a significant advance in the provision of magnet devices with a high gradient magnetic field, but nonetheless it would be beneficial to provide an improved device.

Viewed from a first aspect, the invention provides a magnet apparatus for generating a high gradient and/or high strength magnetic field, the magnet apparatus comprising: two main permanent magnets located side-by-side with oppositely oriented magnetic field polarities and end surfaces of opposite polarities next to one another, wherein the magnetic anisotropy of the magnets exceeds the magnetic induction of the material of the magnets; and at least one mask on a first end of each of the adjacent permanent magnets, the masks comprising a permanent magnet material covering adjacent end surfaces of the two permanent magnets with a gap in the masks along a joining line between the two permanent magnets to form a zone of high-gradient magnetic field above the joining line; wherein the permanent magnet of each mask is oriented with its polarity out of alignment with the polarity of the main permanent magnet that it is attached to.

The apparatus of the first aspect differs from prior art devices in that in place of the non-retentive material, previously considered as an essential feature for the mask elements, a permanent magnet mask is used, with its polarity out of alignment with the polarity of the main permanent magnets. It has been found that the use of magnet material for the masks can produce increased magnetic field gradients and/or improved guidance of the magnetic field than the use of non-retentive material as in the prior art. An increased gradient can have advantages for various applications of the magnet apparatus, including the various examples described herein. In addition, using magnets rather than non-retentive materials means that the total volume of the magnet remains unchanged and that it can be easier to control the form of the magnetic fields.

The additional masks may be of similar material to the main two permanent magnets, wherein the magnetic anisotropy of the magnets exceeds the magnetic induction of the material of the magnets.

The polarity of the magnet masks is out of alignment with the polarity of the permanent magnet. This ensures that the magnetic field of the magnet masks can guide the magnetic field of the magnet apparatus to thereby affect field strength and/or that the magnetic field of the magnet masks opposes the magnetic field of the magnet apparatus in order to affect the gradient of the magnetic field. The polarity may be at least 10° out of alignment with the polarity of the main permanent magnets, for example 20° or more out of alignment and perhaps 45° or more.

In some embodiments, for example where a maximum change in gradient of the magnetic field is required, the magnet masks have their polarity in opposite orientation to the polarity of the main permanent magnets or within 30° of the opposite orientation, preferably within 20° of the opposite orientation, for example. This arrangement may be used, for example, in geometries below with multiple magnet masks. Thus, in the case where the main permanent magnet has its south pole at the masked end surface, then the additional mask(s) will have their south pole facing the end surface (optionally embedded in it) and their north pole facing in the same direction as the south pole of the main permanent magnet.

In alternative arrangements, it may be advantageous to have the polarity of the magnet masks aligned with the direction of the magnetic field of the magnet apparatus, for example by having the polarity of the masks in a perpendicular direction to the polarity of the permanent magnet masks or within 30° of perpendicular, preferably within 20° of perpendicular, i.e. at 70-110° thereto. This allows the magnetic fields of the masks to guide the magnetic fields of the main permanent magnets to thereby increase the peak magnetic field strength at the gap. In this arrangement the polarities of the masks at either side of the gap are preferably aligned with each other. The masks may for example have a N—S direction at 70-110° and 250-290° to the respective main permanent magnet, with the N—S direction across the end surfaces of the main permanent magnets being oriented with the north pole at the side where the main permanent magnet has its south pole at the end surface and the N—S direction across the end surfaces of the main permanent magnets being oriented with the south pole at the side where the main permanent magnet has its north pole at the end surface.

Other alignments are of course possible, and in different cases different alignments can be selected depending on the desired effect.

The permanent magnet mask may take any form, for example in geometries as described below, and it may be used in combination with non-retentive masks.

Optionally, the mask(s) may be embedded within the magnets and/or have a varying thickness. Optionally, the mask(s) have a maximum thickness greater than a tenth of the thickness of the respective magnet. This limit on the minimum thickness may be applied in combination with the use of embedded/varying thickness masks, or with non-embedded and constant thickness masks.

With this arrangement the characteristics of the magnetic field are improved compared to those of prior art arrangements such as US 2010/0012591, which uses a mask of non-retentive material and has a non-embedded and flat mask with constant thickness, with a thinner mask as the preferred embodiment. A non-retentive thin mask may easily become saturated leading to poor performance. This problem does not arise with a mask made of permanent magnet material. The geometry of the mask is also significant. A mask with varying thickness and/or embedding of the mask into the magnets has been found to generate improvements in the magnetic field. The maximum thickness of the mask is the largest thickness of the mask where it is placed on the magnet, including any thickness embedded in the magnet as well as any thickness extending above the maximum extent of the magnet.

In some examples the varying thickness and/or embedding is utilised such that the exposed surface of the mask meets and intersects with the exposed end surface of the magnet at the edge of the mask adjacent to the gap, for example such that there is no 'step' between the surfaces. The exposed surface of the mask in this instance is the main surface of the mask and in the example embodiments there may be no side or edge surface of the mask where the mask meets the gap. The angle between a tangent to the mask surface and a tangent to the magnet surface at the meeting point of the surfaces may be less than 60 degrees, preferably less than 45 degrees and more preferably less than 30 degrees. In cases where the mask is fully embedded into the magnet then the angle between the tangents may be about zero degrees. By removing the 'step' at the gap one allows the accessible active area, for example the area where a sample might be placed, to be closer to the magnet where the magnetic field will be higher.

It is also preferred, in some cases, for the masks to each have a maximum thickness that is greater than a half of the width of the gap or greater than the full width of the gap. This can aid in avoiding saturation of the masks, although in some cases, for example with thinner magnets, then masks thinner than the gap width can be effective. The thickness of the masks would typically be less than five times the width of the gap. Thus, the thickness of the masks might be between a half and five times the width of the gap, or perhaps between one and five times the width of the gap.

The masks may be relatively thick compared to the thickness of the respective magnets (i.e. the depth of the magnets from the first ends thereof to second ends thereof). In some examples, the thickness of the mask may be greater than a fifth of the thickness of the magnet, more preferably greater than a third, and possibly greater than a half. As noted above the thickness of the mask is important in avoiding saturation and therefore the minimum thickness may beneficially be set based on the thickness of the related magnet. In the prior art, for example in US 2010/0012591, the mask thickness is always considerably less than a tenth of the depth of the magnets.

Although a relatively thick mask has advantages it should be noted that it is not essential. For some uses, for example with magnetic bearings or applications requiring a relatively low magnetic field, a thinner mask can be used.

Typically the magnet apparatus would be arranged symmetrically about the join between the two magnets, with the set of magnets and the associated masks having substantially the same dimensions, and the gap being centred on the join.

Thus the two magnets may have the same thicknesses and shapes and the two masks may have the same thicknesses and shapes. This gives a symmetrical magnetic field. However, for some applications a non-symmetrical arrangement could be used in order to provide a non-symmetrical magnetic field, for example for non-symmetrical forces in a magnetic bearing or for making a paired set of non-symmetrical fields when two opposed sets of magnets are used as described in more detail below. Hence, where the shape of the masks is discussed herein it should be understood that this may be in the context of two or more symmetrical masks with the same shape, or optionally two or more different masks where the shapes and thicknesses may be different.

There may be two masks, one on each of the magnets, with the gap formed between the masks. This is a preferred arrangement for providing a high strength magnetic field. In another arrangement there may be more than two masks spaced apart from each other and placed in strips across the end surfaces of the two magnets with gaps in between. This can generate increased peaks in magnetic field gradient. It is also possible to have a single mask with the gap formed as a hole within the mask over the joining line. A further possibility is to have a number of small masks such as cylindrical or disc shaped masks placed in an array on the end surfaces of the two magnets, for example as a series of discrete masks with two lines along either side of the joining line, or as an array extending across the surfaces of the magnets. The discrete masks may be any shape. It should be noted that it is only required for a part of the end surfaces of the magnets to be covered by the masks. There can also be an area or several areas of the magnets where the end surface is not covered by a mask.

The use of two main permanent magnets is a minimum and the apparatus may include more than two main permanent magnets with more than one gap. There may be three or more main permanent magnets arranged side-by-side with adjacent magnets having oppositely oriented polarities, and masks for each main permanent magnet with gaps along the each of joining lines between side-by-side main permanent magnets. Thus, for example, there may be three main permanent magnets with two joining lines and hence two gaps, or four main permanent magnets with three joining lines and hence three gaps. This arrangement can create multiple regions with a high magnetic field and/or high magnetic field gradient. Each mask and each main permanent magnet can be the same as the other mask/main permanent magnet or the masks and main permanent magnets may vary in shape and size.

The size of the gap width relative to the depth of the main permanent magnets may also be important in order to avoid saturation of the masks. Hence, in preferred examples the gap width may be may be greater than a tenth of the thickness of the main permanent magnet, more preferably greater than a fifth, optionally greater than a third and possibly greater than a half. Thus, in some embodiments both the gap width and the thickness of the masks are relatively large compared to the size of the main permanent magnets, and also the thickness of the main permanent magnets is between one and five times the width of the gap.

The absolute size of the mask and also of the gap may vary depending on the scale of the magnet apparatus. For typical applications the mask may be at least 0.5 mm thick, preferably more than 1 mm thick and/or the gap may be at least 0.5 mm thick, preferably more than 1 mm thick.

The masks may be embedded in the main permanent magnets, or they may have a varying thickness, or the masks may include both embedded parts and a varying thickness.

One or both masks may have a part or the whole of its depth embedded in a recess in the respective main permanent magnet. By embedded, it is meant that at least a part of the mask is recessed into the magnet beyond the extent of the magnet at the gap. Thus the main permanent magnet may be effectively thinner where there is an embedded part of the mask and thicker at the gap. The recess may have a constant depth, for example with a mask of rectangular section embedded in the top of the magnet. Alternatively, the recess may have a varying depth and optionally curved lower surface, to house a mask of varying thickness. The mask may comprise one unitary part, with a portion of that part embedded in the main permanent magnet and a portion extending beyond the extent of the main permanent magnet at the gap. One example embodiment includes a mask, or part of a mask, with a rectangular cross-section embedded in a recess of corresponding cross-section in the main permanent magnet.

The masks have a varying thickness in some examples. Optionally the masks are both embedded and have a varying thickness. The use of a varying thickness allows for an improved magnetic field. Some possible arrangements use a mask with a wedge shaped or triangular cross-section. It is preferred for the thickness of the mask close to the gap to be less than the maximum thickness of the mask. Thus, one or both of the masks may have a tapering thickness close to the gap, for example a mask with a trapezium cross-section where the parallel sides of the trapezium form the exposed and embedded surfaces with at least the end of the trapezium close to the gap having an angled profile. If the mask is embedded then the trapezium cross-section should have an acute internal angle at the outside surface of the mask and an obtuse internal angle at the embedded surface of the mask. One or both masks may have a curved surface. The curved surface may be the exposed surface of the mask with the opposite surface being flat and confronting a flat surface of the main permanent magnet. This can be easy to manufacture as the mask material will generally be relatively easy to manufacture with a curved shape, for example by machining and/or casting, whereas the magnet material may be harder to form into a curve. However there can also be advantages in having a curved lower surface recessed into the main permanent magnet, in combination with a curved or a flat exposed surface of the mask.

The curved surface of the mask may comprise a convex surface. One preferred arrangement uses a mask with a rounded exposed surface such that the mask has a cross-section enclosed by an arc, such as an arc of a circle or a parabola, for example.

The curved surface of the mask may comprise a concave surface. One preferred arrangement includes a curved cut-out section in the mask, with the curved cut-out section defined by an arc such as an arc of a circle or a parabola for example. The use of a curved cut-out can allow for the mask and optionally the main permanent magnets to be closely fitted to a curved vessel, such as a sample vessel. With this arrangement it is preferred for the main permanent magnets to also have a correspondingly curved surface where they are exposed at the gap. One possibility is for the masks, and optionally also the main permanent magnets, to have cut-outs that together form part of the circumference of a cylinder centred above the join between the main permanent magnets. In this case the masks can hold a cylindrical vessel and the magnetic field formed within the cylindrical vessel can be used effectively, for example for separation of particles, including separation of molecules in fluids.

In some cases the mask(s) may comprise layers of materials. For example, the mask(s) may include a sandwich structure using different materials, such as a high saturation, low permeability material closest to the magnet, followed by a layer of a medium saturation and medium permeability material, and follow by a low saturation, high permeability material.

In some examples the apparatus includes a mask with one surface in contact with the main permanent magnet, an air gap at the other surface of the mask, and a further mask layer beyond the air gap. This can be repeated, with additional air gaps and additional mask layers. The air gap may have a varying thickness. The further mask layer(s) may have varying thickness. The further mask layer(s) may be permanent magnet material or they may be a non-retentive material.

It may also be advantageous to have an additional magnet layer. Thus, the apparatus may comprise the side-by-side main permanent magnets and masks, with the masks having one surface of the masks in contact with the respective main permanent magnet, and the apparatus including an additional magnet layer at the other surface of each mask. The additional magnet layers preferably have a gap between them coincident with the gap between the masks. There may be a further masking element placed in the gap between the additional magnet layers. Thus, the apparatus may form an enclosed space at the gap, between the main side-by-side magnets, the two masks on these magnets, the two additional magnets and the further mask element in the gap between the additional magnets. It should also be understood that this feature is not limited to the use of just two magnets side-by-side with a single gap, there may be more than two magnets with more than one gap as discussed above, and additional magnet layers for each main magnet. There may be an air gap between the masks and the additional magnet layer. The additional magnet layer may have its own masks and/or a yoke.

The side-by-side main permanent magnets may be mounted on a yoke that is joined to the main permanent magnets at the opposite end to the masks. The yoke may therefore form a common base for the two main permanent magnets. The yoke may be made of a non-retentive material, for example a soft-iron material. Alternatively, the yoke may be made of a permanent magnet material, preferably with its polarity aligned with the direction of the magnetic field, i.e. with the north pole of the yoke directed toward the side with the south pole of the main permanent magnet at the opposite end to the masks and the south pole of the yoke directed toward the side with the north pole of the main permanent magnet at the opposite end to the masks. The yoke both supports the main permanent magnets and also improves the magnetic field formed at the opposite end at the gap in the mask. The thickness of the yoke may be similar to the thickness of the masks, for example the yoke may be between a half of the thickness of the masks and twice of the thickness of the masks. It is preferred for the yoke to have a varying thickness, and it may have a similar shape to the masks in some examples. It should also be noted that the yoke need not extend across the entire surface of the main permanent magnets, and could just cover the magnets partially. Alternatively, the yoke may extend across the entire surface of the main permanent magnets and also around the sides of the main permanent magnets, optionally joining to the masks so that the main permanent magnets are fully encased aside from at the gap along the join line.

The yoke may have a generally rectangular shape extending across the width of the two main permanent magnets.

Alternatively the yoke may have a rounded shape, for example with a flat surface confronting flat ends of the two main permanent magnets and a curved surface as the outer surface of the yoke. The curved surface may by defined by an arc such as an arc of a circle or a parabola for example. The curved or the rectangular yoke may be combined with masks of any shape. One preferred combination uses curved and embedded masks as well as curved yokes.

The magnet apparatus may comprise the two magnet masks along with additional masks beside each of the two masks, the additional masks being further from the joining line and spaced apart from the two masks along the end surfaces of the main permanent magnets. Thus, the original two masks form two central masks, with the additional masks spaced apart at either side of the two central masks and part of the end surfaces of the two main permanent magnets exposed between the two central masks and the additional masks. There may be multiple additional masks all spaced apart from one another such that a sequence of masked and unmasked regions are created on the surface of the two main permanent magnets, for example there may be six or more additional masks on each side. This arrangement results in a repeating increase and decrease in high-gradient magnetic field, with repeated peaks in the magnetic field, and the resulting arrangement has benefits in various fields, for example when separating particles, or when seeking to create a magnetic bearing.

The additional masks may be embedded within the two main permanent magnets and/or have a varying thickness. The additional masks may in some cases all have the same size and geometry. They may have a similar width to the two central masks. They may be embedded with a similar depth to the two central masks, although different depths may also be used.

The material of the additional masks may be a non-retentive material as described above in connection with the prior art. Alternatively, the additional masks may advantageously be made of a magnetically retentive material, for example a permanent magnet material, with the polarity of the magnet of the mask reversed compared to the polarity of the main permanent magnet that is being masked in the same way as for the other magnet masks.

Whilst the preferred embodiments depicted in the Figures of this application show generally rectangular magnets as the main permanent magnets, the examples of the invention are not limited to this geometry and in some examples non-rectangular magnets may be used, such as magnets with a varying thickness and/or curved magnets. When the magnet has a varying thickness and/or a curve then the geometry of the masks (and the optional yoke) should be adapted accordingly. For example, if the magnets are used in a device with a tubular configuration then they may be formed as curved magnets forming parts of a circular circumference of a tube, or they may have a cross-section shaped as a sector or a segment of a circle. The curvature or varying thickness of the magnets may also be in two axes, for example to form a sector or a segment of a sphere or other solid.

The magnet apparatus may have just a single set of adjacent main permanent magnets and hence may consist of just two or more side-by-side magnets with masks as described above. Such an apparatus has utility in the separation of particles, for example. Multiple sets of magnets and masks might be placed in series with a flow of a working fluid, for example a fluid including particles for separation, flowing over the series of sets of magnets.

It is also possible to use two opposed sets of magnets, and in some preferred arrangements the magnet apparatus therefore includes a first set of main permanent magnets, with masks, as well as a second set of main permanent magnets, with masks, the first set of magnets and the second set of magnets facing each other with the two gaps parallel. This type of arrangement can provide enhanced separation of materials in some cases, which could use magnets oriented so that the magnetic fields of the two sets of main permanent magnets repel each other or magnets oriented so that the magnetic fields attract one another. There may be further sets of magnets included, for example by having repeated magnet apparatuses stacked on top of one another.

Non-parallel gaps can also have some benefit. For example if the two gaps are perpendicular then there will be areas where the magnetic fields of the two sets of magnets repel each other, and areas where the magnetic fields attract. This can be useful in some applications, for example when separating certain differing types of particles.

The two sets of magnets may be arranged for relative rotational movement about an axis extending along a normal to the joining line. Thus, the magnets may be able to rotate from an orientation where the magnetic fields repel, to an orientation where the magnetic fields attract.

This arrangement can also form the basis of a magnetic bearing, in which case the magnetic fields of the two sets of magnets should be arranged to repel one another in order to maintain separation between mechanical parts. In the case of a bearing there may be multiple groups of two opposed sets of magnets, for example arranged for rotating movement in a shaft, with the sets of magnets moving relative to one another along the line of the join between the magnets so that there is always a repulsive force. Possible arrangements for a magnetic bearing are discussed in more detail below.

When two opposed sets of main permanent magnets are used then the two sets of magnets should be facing each other such that the outer surfaces of the masks of each set of magnets face one another. Two similar sets of main permanent magnets may be used, with similar shape and size for the magnets and the masks in each set, thus allowing for a symmetrical combined field. The two sets of main permanent magnets may be arranged so that the gaps are aligned, or alternatively the gaps may be offset. An offset gap can increase the active area by making a larger area with the required magnetic field characteristics.

The orientation of the main permanent magnets need not be fixed relative to a working element, such as a container with particles to be separated. The magnet apparatus may include a rotating wheel allowing for the main permanent magnets and masks to be rotated in-plane. Thus, the main permanent magnets and masks may rotate about an axis that extends normal to the magnet end faces. Rotation and relative movement may generate an improved separation effect and/or allow for certain particles or other objects to be manoeuvred from place to place. In the case of two pairs of magnets, it may be advantageous to rotate one pair relative to the other pair so that the gaps are turn from parallel with the magnetic fields repelling one another, to perpendicular, to parallel with the magnetic field attracting one another, to perpendicular, and back to the first parallel orientation. Again this can allow for particles or other objects to be manoeuvred.

Rather than the use of yokes or other bases, the magnet pairs may have masks on both of the end faces, thus generating a double sided arrangement. This could be useful in a device that uses multiple stages, for example for multi-stage separation of particles, since the same magnets can be used for two stages of a separation process, i.e. a flow path can be first along one side of a pair of magnets, and then along the opposite side of the pair of magnets. Different mask designs may be used on the two sides of the magnets in order to generate different magnetic fields.

The magnetic apparatus discussed above can be for separation of particles, for example for separation of particles of differing types having different paramagnetic and/or diamagnetic properties. In a further aspect the invention hence extends to a particle separator comprising the magnet apparatus. The particle separator may further comprise a sample container or sample plate for holding the particles to be separated. The particles may be a mix of particles of different types within a fluid. The particles may be molecules within a fluid, with the magnetic apparatus hence being used for separation of molecules in a fluid, such as for separation of gases. The sample container or plate may be provided with a vibrator for vibration of the container or plate. This can aid separation of particles. The separator apparatus may be used in the production of clean and super pure substances and materials in electronics, metallurgy and chemistry, separation of biological subjects (red blood cells, "magnetic bacteria", etc.) in biology and medicine, removal of heavy metals and organic impurities from water and so on.

The magnet apparatus may be for use as a high-sensitivity magnetic separator for separation of different types of paramagnetic substances and materials from diamagnetic ones, for division of the paramagnetic substances and materials in terms of the magnitudes of their paramagnetic susceptibility, and also for division of the diamagnetic substances and materials in terms of the magnitudes of their diamagnetic susceptibility.

By non-retentive it is meant that the material of the non-retentive masks, where present and also optionally the yoke has substantially no retentivity for magnetic field such that the remnant magnetization for the material after a magnetic field is removed is substantially zero. A magnetically soft material may be used for the non-retentive material, for example soft iron or iron alloys can be used. Possible iron alloys include nickel iron alloys or silicon iron alloys. In some examples the mask (and optionally the yoke) comprises vanadium permendur or vandadium-cobalt-iron alloys of the type known as Supermendur.

The magnets used as the main permanent magnets and/or for the magnet masks may be made of Nd—Fe—B, Sm—Co, or Fe—Pt, for example.

In further optional arrangements, the magnet apparatus of the first aspect and the preferred/optional features thereof as described above may be used in a magnetic bearing. The magnetic bearing may comprise: first and second bearing surfaces; and at least one magnet apparatus as discussed above on each bearing surface, wherein the magnet apparatus on the first bearing surface provides a magnetic field opposed to the magnetic field of the magnet apparatus on the second bearing surface.

Preferably the magnetic bearing is arranged such that the first and second bearing surfaces are magnetically repelled from one another in mechanical equilibrium. By mechanical equilibrium it is meant that the first and second bearing surfaces are in static equilibrium when at rest, and support the bearing load stably when in motion. There is no instability that could cause the opposing magnet assemblies to move into a configuration where they cannot support the static or dynamic loading on the bearing and in particular there is no instability that could cause the magnet assemblies to move into a position where there is a magnetic attraction rather than magnetic repulsion. Preferably the mechanical equilibrium is such that the bearing maintains a stable separation distance between the first and second bearing surfaces.

It is preferred for the two bearing surfaces to be close to one another since this type of magnetic field decreases in strength sharply with distance. Hence, in preferred embodiments the separation/clearance between the two bearing surfaces (at the locations of the opposed magnet assemblies) is small, for example less than 0.5 mm, preferably less than 0.4 mm and more preferably less than 0.2 mm. For the purposes of the magnetic repulsion there is no minimum for the separation, but clearly a minimum is required to allow for manufacturing tolerances and also to provide for a degree of misalignment or play for the parts that the bearing supports. Hence a suitable minimum spacing may be 0.005 mm, more preferably 0.01 mm.

In one example embodiment the main permanent magnets are generally rectangular in cross-section and the masks consist of two plates of permanent magnet material on surfaces along edges of the rectangle. The gap in this arrangement is formed by spacing between the two mask plates along the joining line of the main permanent magnets. The masks may sit atop the main permanent magnets, such that the gap is an air gap bordered on two opposite sides by edges of the mask and on a third side by exposed parts of the magnets. Alternatively, the masks may be set into recesses in the main permanent magnets such that the exposed parts of the magnets protrude into the gap and partially or completely fill it. The latter arrangement allows for the bearing to have a smooth surface, which may reduce windage losses. The masks and main permanent magnets may alternatively take any of the other geometries described above.

The proposed magnetic bearing may be used as any type of bearing, including rotating or sliding bearings, bearings supporting a shaft, bearings supporting a moving body on a rail or for freely sliding motion on a machine bed, hinge bearing, spherical (ball) joints and so on. The example magnetic bearings discussed below and in particular the examples set out in the description of the Figures and preferred embodiments are not intended to be limiting. Instead the basic principle of utilising opposed pairs of magnets with zones of high gradient magnetic fields can be adapted to many appropriate bearing applications. Thus, the bearing surfaces may be generally flat surfaces with opposed magnetic fields from generally flat magnet assemblies, or the bearing surfaces may be cylindrical, with cylindrical magnet assembles providing repelling forces to support a shaft during rotation. A shaft may also be supported for sliding movement by an arrangement of magnet assemblies along the length of tubular bearing surfaces, for example in a circular tube.

In a simple arrangement, which could be used for rotating or sliding bearings, the joining line of the magnet apparatus on the first bearing surface is aligned with, in parallel with and directly opposes the joining line of the magnet apparatus on the second bearing surface. This provides direct alignment of the magnetic fields and hence a strong repulsion but there is a risk of instability and therefore in this arrangement it is preferred for the bearing to also include a restraining mechanism to ensure that the two joining lines remain aligned. For example, a mechanical device may constrain the bearing surfaces such that they cannot move away from alignment. In a more preferred arrangement, which avoids the potential disadvantages of mechanical friction and wear, a further magnetic bearing is used to constrain the bearing surfaces. In one specific example, ring shaped magnet apparatuses are used to form a bearing that will hold axial forces via a ring or disc on a shaft that the main bearing supposed.

In some preferred embodiments the joining lines are parallel but the centre of the magnetic field of the magnet apparatus on the first bearing surface is offset by a small amount from the centre of the magnetic field of the magnet apparatus on the second bearing surface. This allows a stable repulsion to be created by an appropriate geometry for the magnet apparatuses and/or by the use of additional magnet apparatuses or mechanical bearings. The magnetic field has a tendency to increase the offset and this can be opposed to ensure stability. The offset should be selected based on the strength and size of the magnetic fields, the required bearing capabilities and the number of magnetic assemblies being used to provide the repulsive force for the bearings. In typical situations the offset may be in the range of 0.005 mm to 0.4 mm, more preferably 0.01 mm to 0.2 mm.

For example, ring shaped magnet apparatuses may be provided with circular joining lines and an offset between the joining lines being provided by a difference in diameter. With this example the magnetic field for one of the bearing surfaces will sit concentrically within the magnetic field for the other and this will form a stable thrust bearing for supporting a shaft for rotating movement.

In another example the magnetic bearing may comprise at least two magnet apparatuses on each bearing surface, preferably one or more pairs of magnet apparatuses, wherein a first set of opposed magnet apparatuses on the first and second bearing surfaces are offset from one another in a first direction, and a second set of opposed magnet apparatuses on the first and second bearing surfaces are offset from one another in an opposite direction. Thus, with the magnetic fields viewed in cross-section the first set of magnet apparatuses may have one field above the other and the centre of the upper field positioned to the left of the centre of the lower field, whereas the second set of magnet apparatuses may have one field above the other and the centre of the upper field positioned to the right of the centre of the lower field. The offset for the first set of magnetic fields creates a tendency for the upper magnet assembly to move to the left, but this is opposed by the tendency for the upper magnet apparatus of the second set to move to the right. The arrangement is therefore stable. The two sets of magnet apparatuses extend in parallel with lines along the centres of the magnetic fields for one bearing surface being just within lines along the centres of the magnetic fields for the other bearing surface. This can be embodied as a sliding bearing, in which case the parallel lines would be like rails, or as a rotating bearing, in which case the parallel lines form nested rings.

In an alternative arrangement the joining line of the magnet apparatus on the first bearing surface is at an angle to the joining line of the magnet apparatus on the second bearing surface, preferably an angle of greater than 45 degrees and more preferably the joining lines of opposed magnet apparatuses are perpendicular. With this arrangement the crossing point of the two joining lines provides the location for the repulsive force. When using a non-parallel arrangement of this type it is preferred to have a plurality of magnet apparatuses on each bearing surface in order to create a plurality of crossing points. It should, however, be noted that a single magnet apparatus formed in a spiral on a cylindrical bearing surface can provide the required plurality of crossing points when used with a second cylindrical bearing surface that has an opposite spiral.

The non-parallel magnet apparatuses may be used for a sliding bearing for linear movement, for example by providing four or more crossing points to give a stable support on a flat bearing surface. Four crossing points can be provided by having two parallel magnet apparatuses on the first bearing surface and two parallel magnet apparatuses on the second bearing surface and arranging the bearing surfaces so that the respective magnet apparatuses are at an angle to one another. A larger number of parallel magnet as apparatuses semblies could be used to generate a large lattice of crossing points.

Other preferred embodiments use helical joining lines for the magnet apparatuses, with one or more magnet apparatuses forming a clockwise spiral about a first cylindrical bearing surface and one or more magnet apparatuses forming an anticlockwise spiral about a second cylindrical bearing surface that is arranged to be concentric with the first bearing surface. With this arrangement the crossing points form a lattice about the surface of the cylinder. Such an arrangement allows for both a sliding and a rotating movement, and yet is in equilibrium for both sliding and rotating motion. This can be a significant advantage where both types of movement are required, for example when a shaft should be supported for rotation whiles allowing axial play. If it is required to permit only rotation or only sliding then the spiral arrangement could be combined with a mechanical or magnetic arrangement to restrain movement of the bearing surfaces relative to one another.

In a further alternative embodiment, the magnet apparatuses may be arranged to give spiral joining lines in the same direction about inner and outer bearing surfaces. This arrangement may advantageously produce a screw bearing, for guiding and supporting a helical movement of one part relative to the other.

With multiple magnet apparatuses on each bearing surface the magnet apparatuses may be placed in the same orientation to have N—S and then N—S. Alternatively the orientation may be alternated so that the arrangement is N—S and then S—N. What is important for the proposed bearing is that on the opposed surfaces the magnet apparatuses have opposed polarity. Provided this is satisfied then the orientation on each surface can be selected as desired. In some preferred embodiments, multiple magnet apparatuses are placed adjacent one another and the joining line between magnet apparatuses is used to provide another concentrated magnetic field. For example, three adjacent magnets will have two joining lines and hence may have two gaps in the mask at each of the two joining lines. In a cylindrical bearing surface two or more magnets may be placed about the circumference of the cylinder to provide two or more joining lines and once again the mask may be arranged to have gaps for each joining line.

To create circular or curved geometries for the magnet apparatuses, for example a joining line that is a circle on a plane or a ring about an axis, then the magnet apparatuses may include curved magnets and/or multiple magnets joined together.

The mask may be a relatively thick mask in comparison with the depth of the permanent magnets as described above, although this is not essential for use in a magnetic bearing. The mask may have a thickness in the range of 0.005 to 2 mm, more preferably 0.01 mm to 1 mm. The thickness may vary for different magnet apparatuses. The width of the gap may be in the range 0.005 to 2 mm, preferably in the range 0.01 to 1 mm and this width is preferably constant along the length of the joining line. It is preferred for the gap to extend symmetrically to either side of the joining line.

Viewed from a second aspect, the invention provides a method of generating a high gradient and/or high strength magnetic field, comprising providing a magnet apparatus as discussed above in the first aspect and/or optional/preferred features thereof. The magnetic field may be used for various purposes. One preferred use is for separation of particles, and another preferred use is as a magnetic bearing. The method may be a method of manufacturing a magnetic bearing by providing multiple magnet apparatuses arranged for repulsive forces. Alternatively the method may be a method for separation of particles comprising: using a magnet apparatus as in the first aspect; and exposing the particles to be separated to the magnetic field generated by the magnet apparatus.

The magnet apparatus used in this method may have any or all of the features discussed above in relation to the first aspect, aside from specialised features relating to magnetic bearings. The method may further include agitating the particles, for example via vibration, in order to promote separation thereof. The method may use flow of a fluid with the particles past or around the magnet apparatus. The particles may be particles having differing paramagnetic and/or diamagnetic properties and hence the method may include the separation of paramagnetic substances from diamagnetic ones, and/or the division of paramagnetic substances depending on their paramagnetic susceptibility, and/or the division of diamagnetic substances depending on their diamagnetic susceptibility. The method may be used in the production of clean and super pure substances and materials in electronics, metallurgy and chemistry, separation of biological subjects (red blood cells, "magnetic bacteria", etc.) in biology and medicine, removal of heavy metals and organic impurities from water and so on. In some preferred examples the particles are nanoparticles. In other examples the particles are molecules.

Certain preferred embodiments of the invention will now be described by way of example only and with reference to the accompanying drawings, in which.

The invention concerns magnet apparatuses with a high magnetic field gradient. The magnet apparatuses use two permanent magnets with opposite polarisation in a Kittel open domain structure. The underlying principle is described below with reference to FIG. 1. A magnet apparatus in accordance with the preferred embodiments makes use of a mask on the magnets, with the mask being made of a magnet material with its polarity out of alignment with the polarity of the underlying magnet. Such an apparatus may be used for various applications, including a magnetic bearing or a separator for separating particles from a fluid or from other particles. Examples focussed on these applications are described below. Other applications also exist, for example, separation of molecules in fluids such as to separate gases from one another as in U.S. Pat. No. 4,704,139, or the use of electromagnetic induction to generate currents. In both cases the large magnetic field strength and/or large gradients for the magnetic field will provide advantages.

The basic factor of magnetic separation is the magnetic force, which acts on a particle of the substance and which is proportional to the magnetic susceptibility of the substance, the value of the magnetic induction B and the value of the gradient $\nabla B$ of the applied magnetic field. Therefore, increasing the sensitivity and selectivity of magnetic separation will require use of the highest possible values of magnetic induction and magnetic field gradient, or their united factor—the product $B\nabla B$. This product $B\nabla B$ is a parameter relating to the sensitivity and selectivity of magnetic separation and it is not the repulsive force itself, which is a more complicated expression. It is advantageous to increase and also control the product $B\nabla B$ in order to achieve an improved magnetic bearing.

Figure 1:
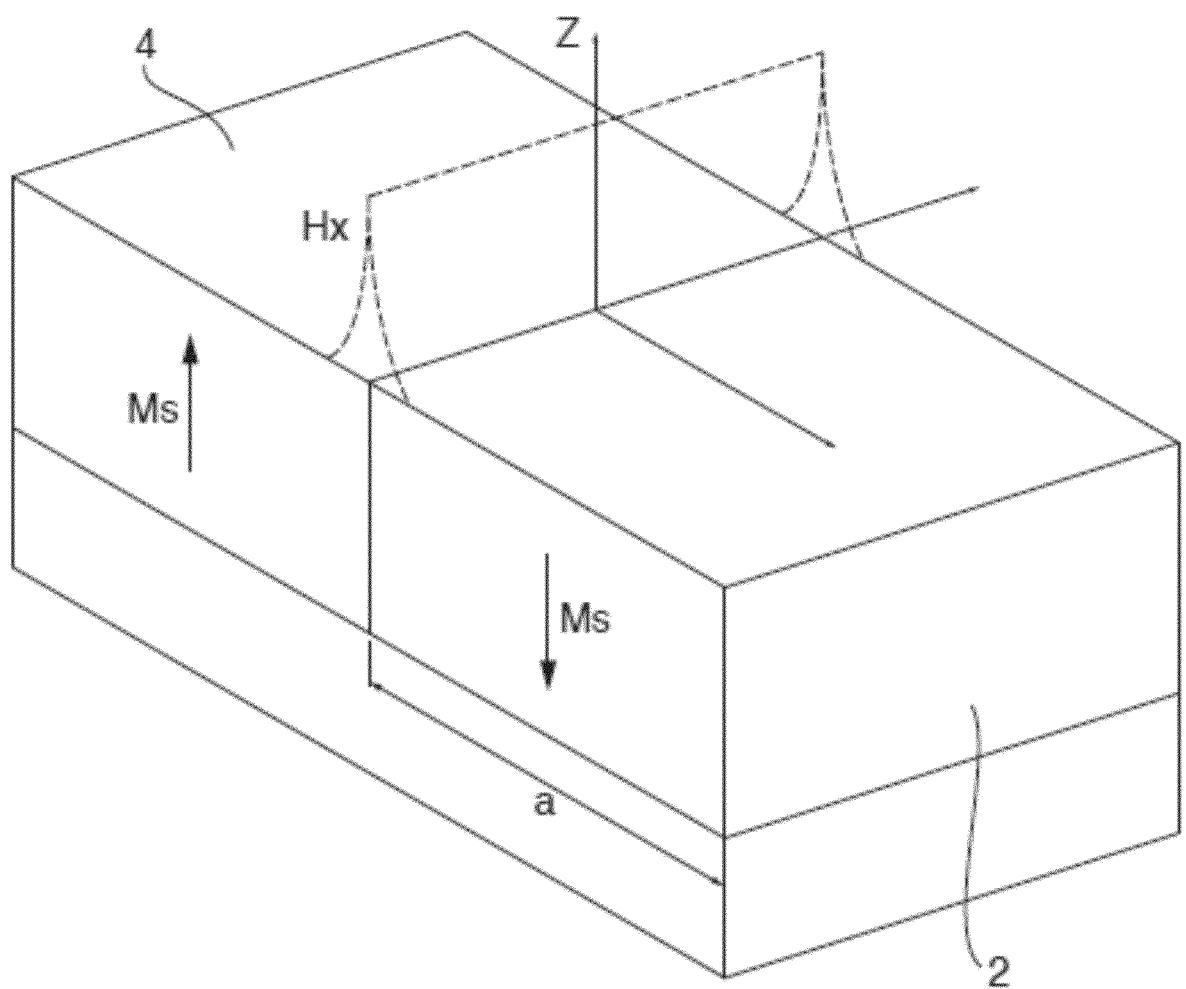
FIG. 1 is an illustration of the Kittel open domain structure of two side-by-side magnets.

FIG. 1 shows a magnetic system having two permanent magnets 2, 4 with opposite magnetization in the form of a Kittel open domain structure. In such a system, near the edges of the faces of the joining magnets, a strong magnetic stray field appears which is caused by the non-diagonal matrix elements of the demagnetization factor tensor, and the value of the product $B\nabla B$ may reach $10^{11}$ mT$^2$/m. On the surface of magnets, in the zone of the upper edges of the joining faces, a strong magnetic stray field appears with the components Hy(x,z), Hz(x,z) and Hx(x,z). The component Hy(x,z) is equal to zero due to the geometry of the system, the vertical component Hz(x,zk) comprises less than half the value of the induction of the magnet material, and the horizontal component Hx(x,z), which in the present case is of greatest interest, can be described by the expression:

$$Hx(x,z)=Ms[\ln(a^2+z^2+2ax+x^2)-2\ln(x^2+z^2)+\ln(a^2+z^2-2ax+x^2)]$$

where:
Ms is the magnetization saturation of the magnets, and a is the size of the magnet along the Ox axis (see FIG. 1).

It follows from this expression that on the plane z=0, at point 0 the horizontal component of the stray field strives into infinity. As a result, in a small area −0.1a×0.1 a, along the line of the joining magnets the horizontal component of the magnetic stray field makes an abrupt jump, which is noted by a dashed line in FIG. 1, the intensity of which can be several times stronger than the induction of the magnet material.

The important practical feature of the magnetic system described is the fact that the stray field Hx(x,z) possesses a high gradient, which in the area near to the point 0 can reach values of $10^6$-$10^9$ mT/m. In this system the value of the product $B\nabla B$ may reach $10^{11}$ mT$^2$/m. The disadvantage of this magnetic system is the impossibility of controlling the form and gradient of the created magnetic fields.

The preferred embodiments herein use a mask to address this and to considerably increase the magnitude of the product $B\nabla B$ in the zone of separation and also regulate the product $B\nabla B$, which gives the practical possibility of using the high magnetic stray fields for the creation of a magnetic bearing.

Figure 2:
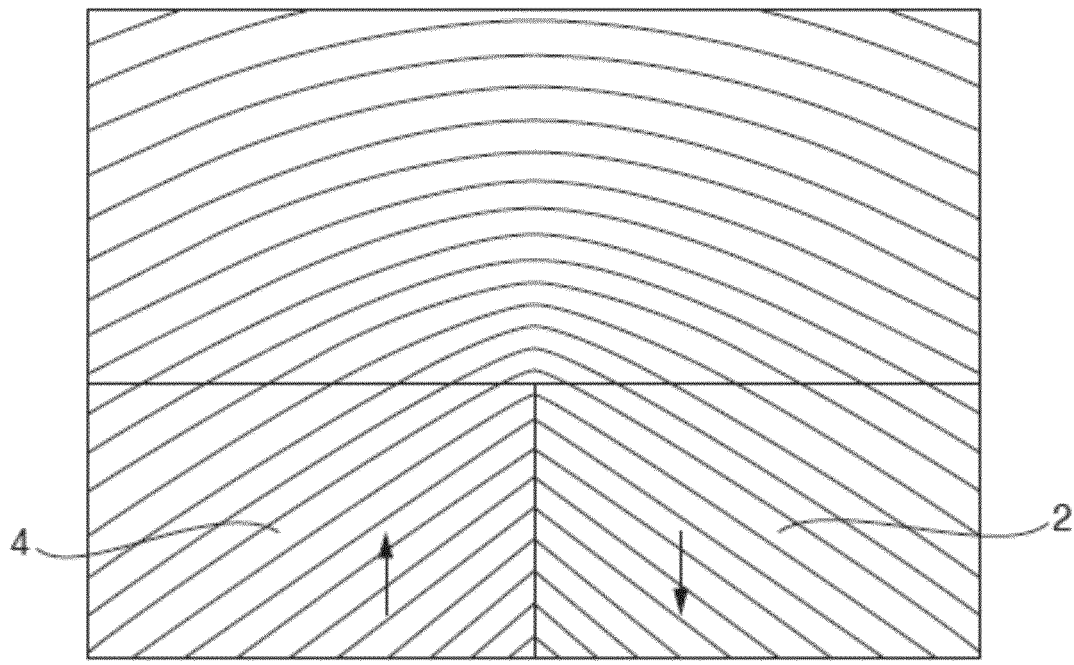
FIG. 2 is a diagram of magnetic field lines in the Kittel open domain structure.
Figure 3:
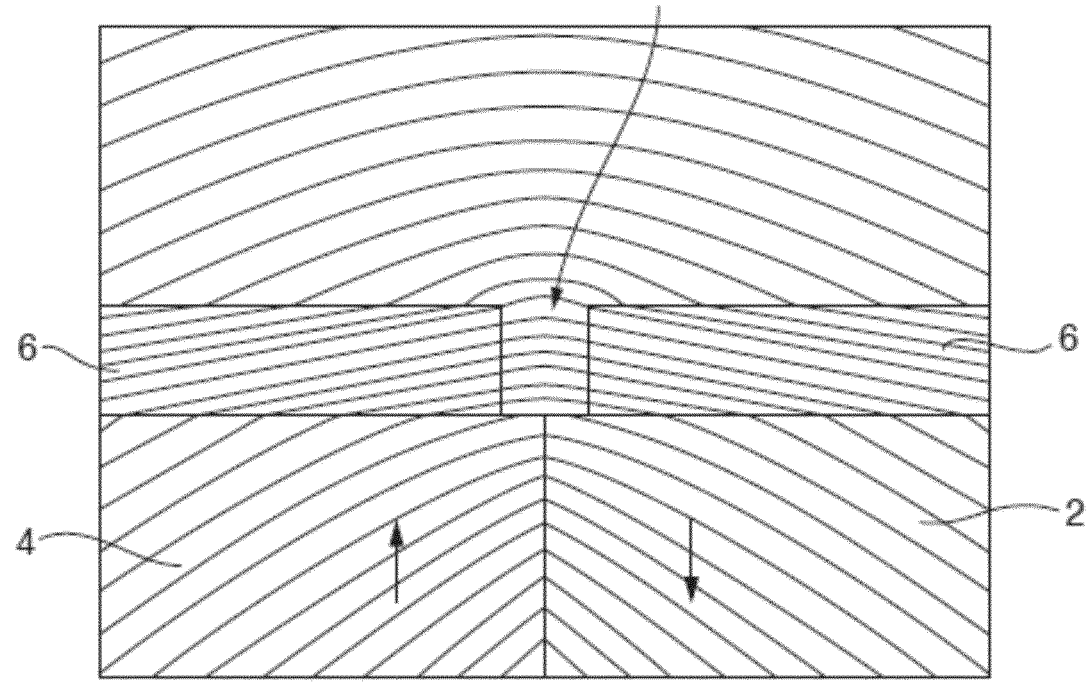
FIG. 3 shows the magnetic field lines in a magnet assembly used in the magnetic bearings of the preferred embodiments.
Figure 10A:
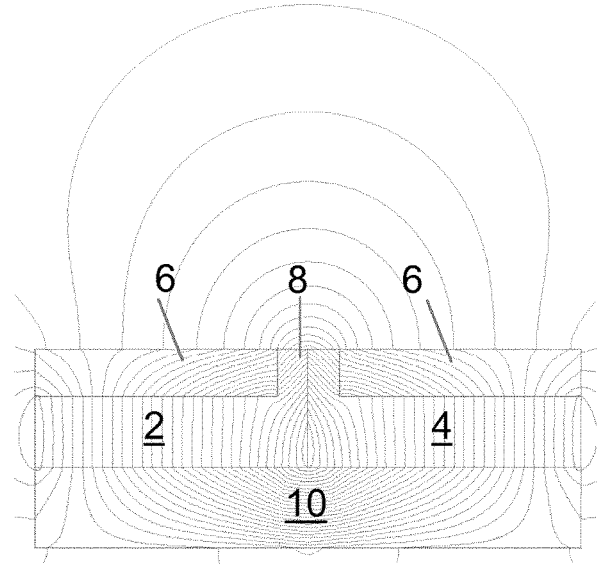
FIG. 10a illustrates magnetic field lines for a magnet apparatus with an embedded mask where the magnetic polarity of the mask is opposite to the polarity of the underlying mask.
Figure 10B:
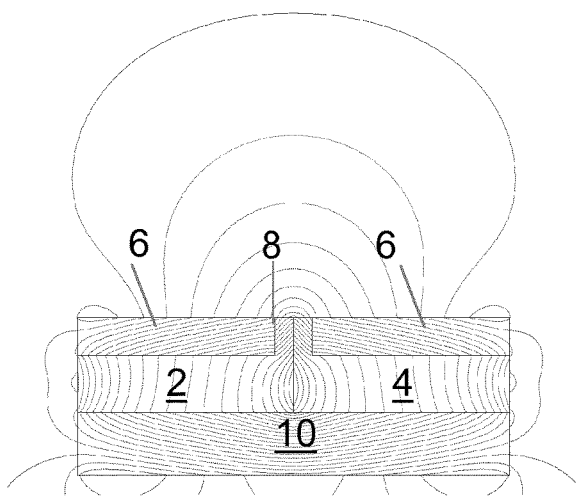
FIG. 10b shows magnetic field lines for a magnet apparatus with an embedded mask where the magnetic polarity of the mask is perpendicular to the polarity of the underlying mask.
Figure 10C:
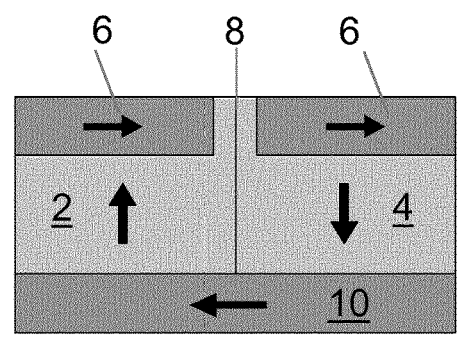
FIG. 10c shows the directions for the polarities of the magnets in the apparatus of FIG. 10b.
Figure 11:
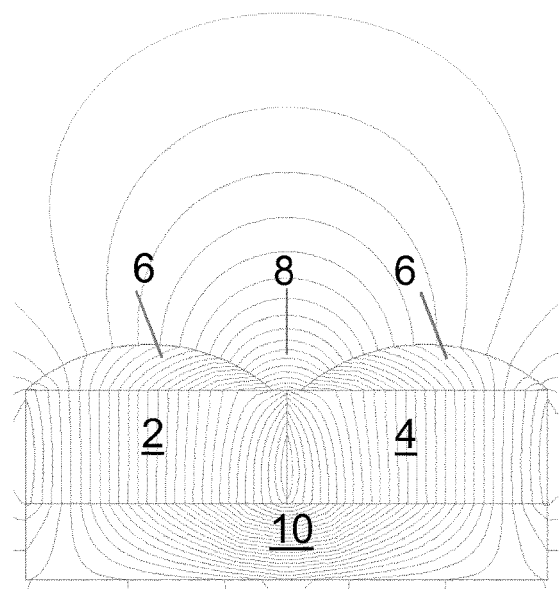
FIG. 11 shows magnetic field lines for a magnet apparatus with a curved mask.
Figure 12:
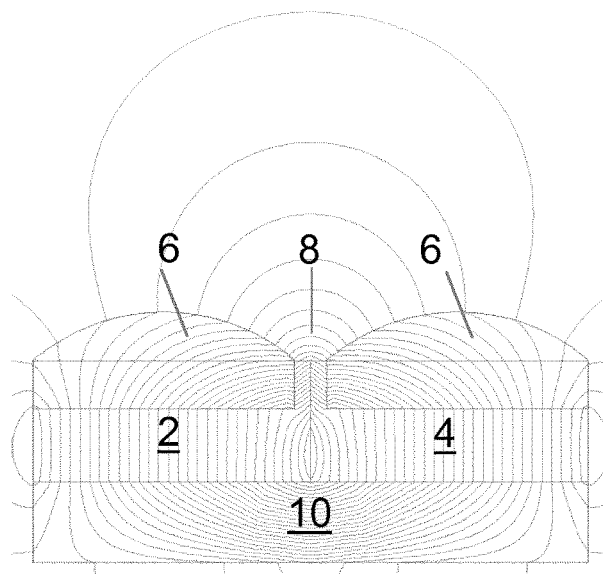
FIG. 12 shows the magnetic field lines for a magnet apparatus using both an embedded mask as in FIG. 5 and a curved mask as in FIG. 6.

The illustrations in FIGS. 2 and 3 demonstrate the change in the magnetic field configuration compared to the known open domain structure that is achieved when a mask 6 is added atop the two magnets 2, 4, as in FIG. 3. With this magnetic system there is a concentration of the magnetic field in the zone formed by the gap 8 between the plates of the mask 6, and also a change in the shape of the magnetic field lines, as well as in the magnitude and distribution of the magnetic induction nearby the edges of the joined sides of the magnets. Thus, the use of the mask 6 as described herein makes it possible to change the parameters of the magnetic field considerably. The mask 6 is made of a magnetic material with its polarity out of alignment with the polarity of the underlying magnet, in this case with an opposite polarity. The examples of FIGS. 4 to 8 also make use of a mask of a magnet material with an opposite polarity, although it should be understood that a different direction for the polarity could be used as well, such as a perpendicular direction as discussed below in relation to FIGS. 10b and 10c.

Figure 4:
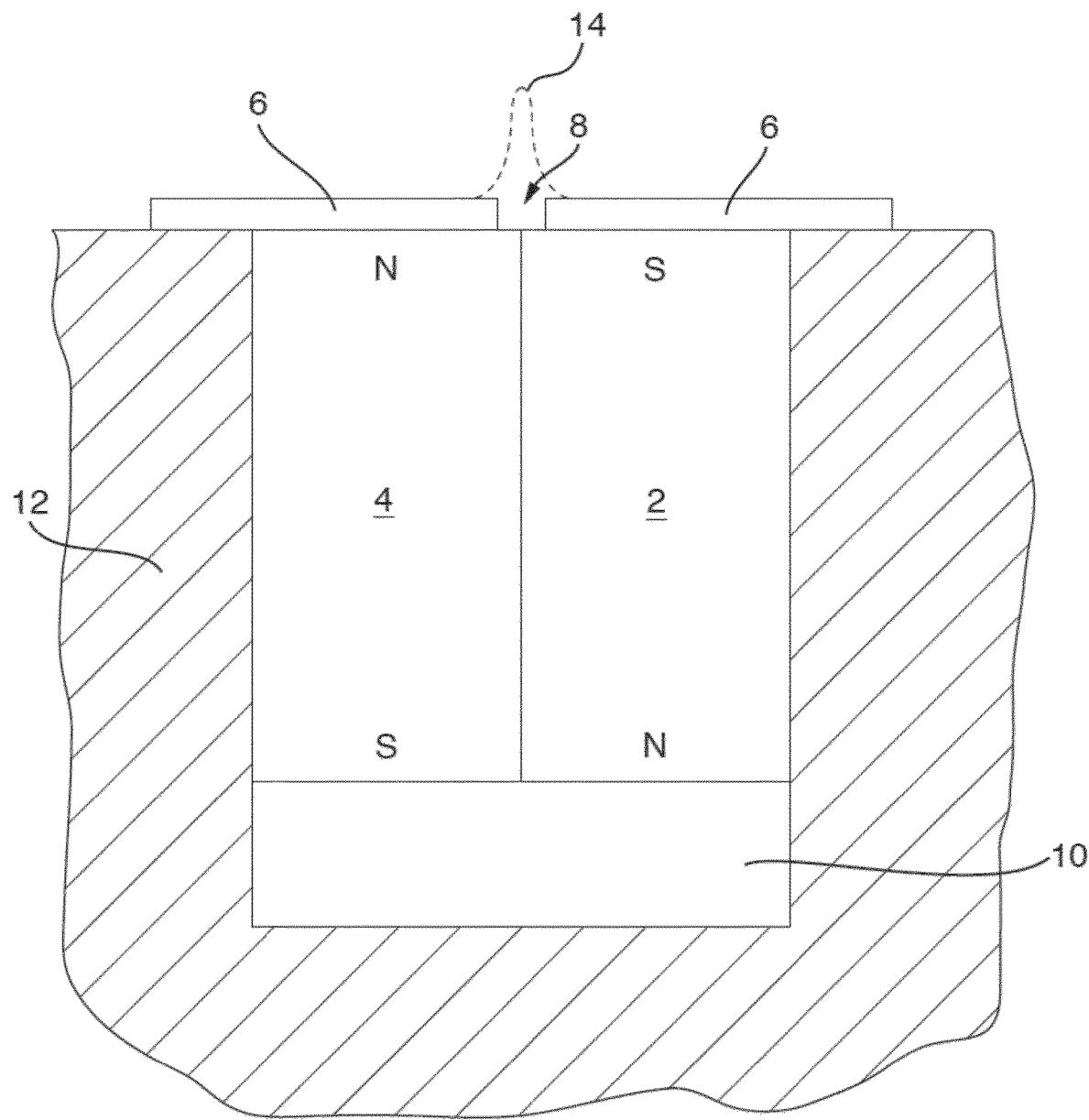
FIG. 4 is a cross section of a magnet assembly used in the magnetic bearings of the preferred embodiments.

FIG. 4 illustrates the primary features of an example magnet apparatus shown in cross-section. Two permanent magnets 2, 4 of the same size and strength are placed adjacent one another with opposite polar orientations. In the example shown the right hand magnet 2 has its north pole facing downward and the left hand magnet 4 has its north pole facing upward. A first end surface of the magnets (the upper end in the orientation shown in FIG. 4) has a mask 6 covering it. The mask 6 in this example is made of relatively thin plates of non-retentive material with a gap 8 at the joining line of the two magnets. Other geometries for the masks 6 are possible as discussed below. The gap 8 is symmetrically arranged with the same extent to either side of the joining line. A base plate or yoke 10 is at the opposite end of the magnets 2, 4 to the mask 6. The various parts are supported in a substrate 12, which is a part of a bearing surface in this example. The arrangement of the magnets results in a zone of high magnetic field gradient at the gap 8, as indicated by the dashed line 14. This provides the greatly increased magnitude for the product $B\nabla B$ referenced above. The examples of FIGS. 4-8 utilise this for a repulsion force in magnetic bearings.

It will be understood that with two opposing and oppositely oriented magnet apparatuses of the type shown in FIG. 4 then there will be a large repulsive force when the two gaps 8 are aligned. Various arrangements can be used to take advantage of this to provide magnetic levitation for a bearing. The magnet apparatus could be generally flat along the joining line between the two magnets 2, 4 and hence could be used for a linear/sliding bearing. Alternatively the magnet apparatus could be curved along the line of the joining line and hence used for a rotating bearing. A curved arrangement could be obtained by the use of several smaller magnets if suitably curved larger magnets are not available. The gap 8 may extend around the inner or outer surface of a cylinder or disc to make a ring shaped magnet apparatus for a journal bearing. The gap 8 may form a circle on a flat surface to make a thrust bearing. In another alternative the magnet apparatus may be arranged to form a spiral along the surface of a cylinder.

Figure 5:
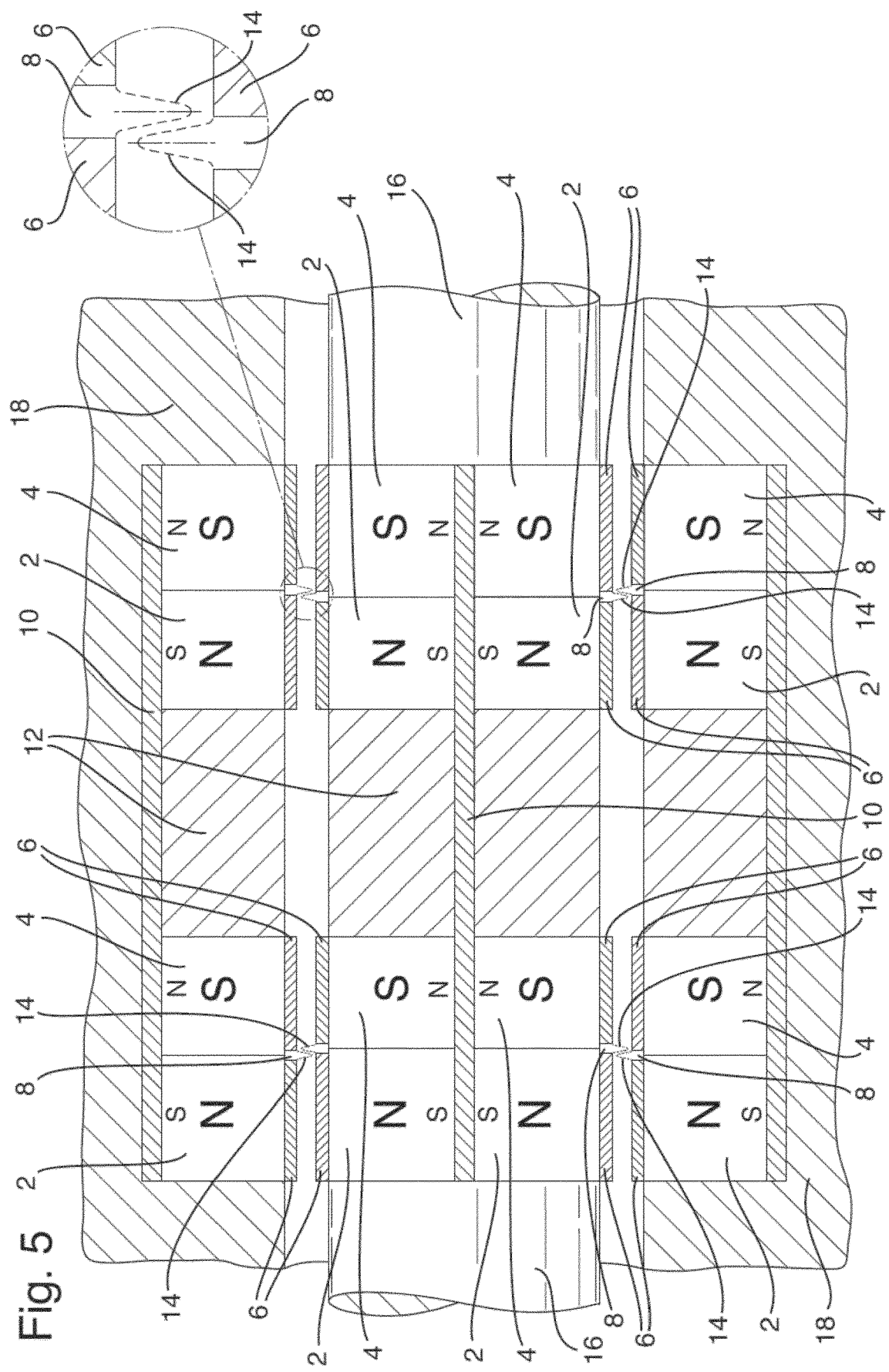
FIG. 5 shows a cross-section of a magnetic journal bearing using two pairs of offset magnetic fields for stability.

An example of a journal bearing is shown in FIG. 5. A shaft 16 is located within a bearing shell 18. The shaft 16 has two pairs of magnet apparatuses where the magnets are formed in rings with a circular gap 8 facing outward from the shaft 16. The bearing shell 18 also has two magnet apparatuses and these have the gap 8 facing inward. Each of the ring-like magnet apparatuses has two magnets 2, 4, a mask 6 and a gap 8 as described in relation to FIG. 4. The base plate 10 is provided for each magnet apparatus and the support 12 is provided by the material of the shaft 16 or the bearing shell 18. The magnetic fields 14 extend across a small clearance gap toward each other and provide the repulsive force to carry the bearing forces. It will be seen that there is a small offset such that the centres of the magnetic fields 14 for the shaft magnet apparatuses are closer together than the centres of the magnetic fields 14 for the bearing shell magnet apparatuses. The shaft 16 is therefore stably supported by the magnet apparatuses and movement in either axial direction is opposed by the interaction of the magnetic fields. This hence provides stable mechanical equilibrium.

Figure 6:
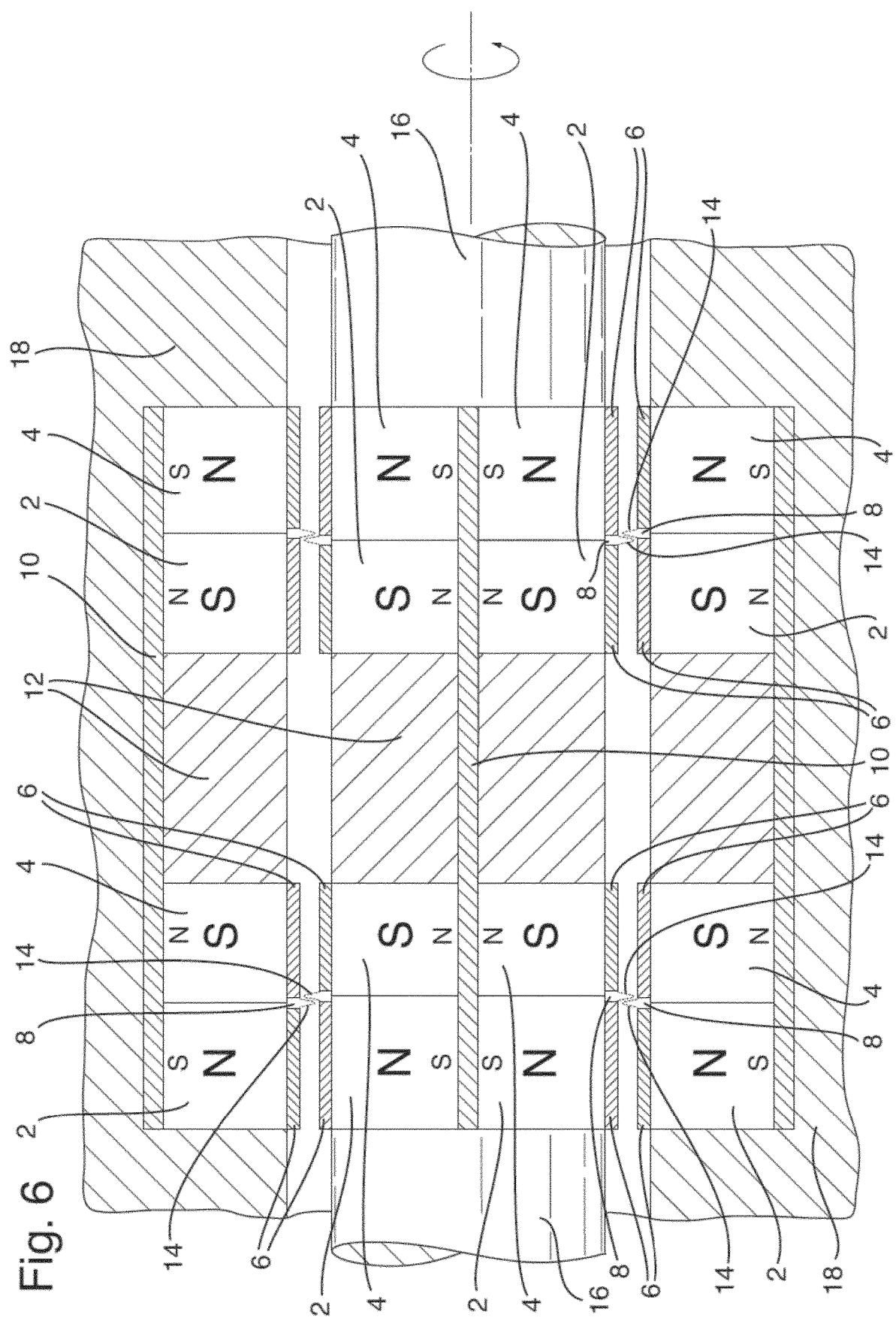
FIG. 6 is a cross-section of a variation of the arrangement of FIG. 5.

FIG. 6 shows a variation on the FIG. 5 arrangement where the opposing magnets at the right hand side are in the opposite polar orientation. Thus, in FIG. 5 the upper line of magnets has, as the lower pole, N—S and then N—S, whereas in FIG. 6 the upper line of magnets has, as the lower pole, N—S and then S—N. Either arrangement will produce the same effectiveness as a bearing.

Figure 7:
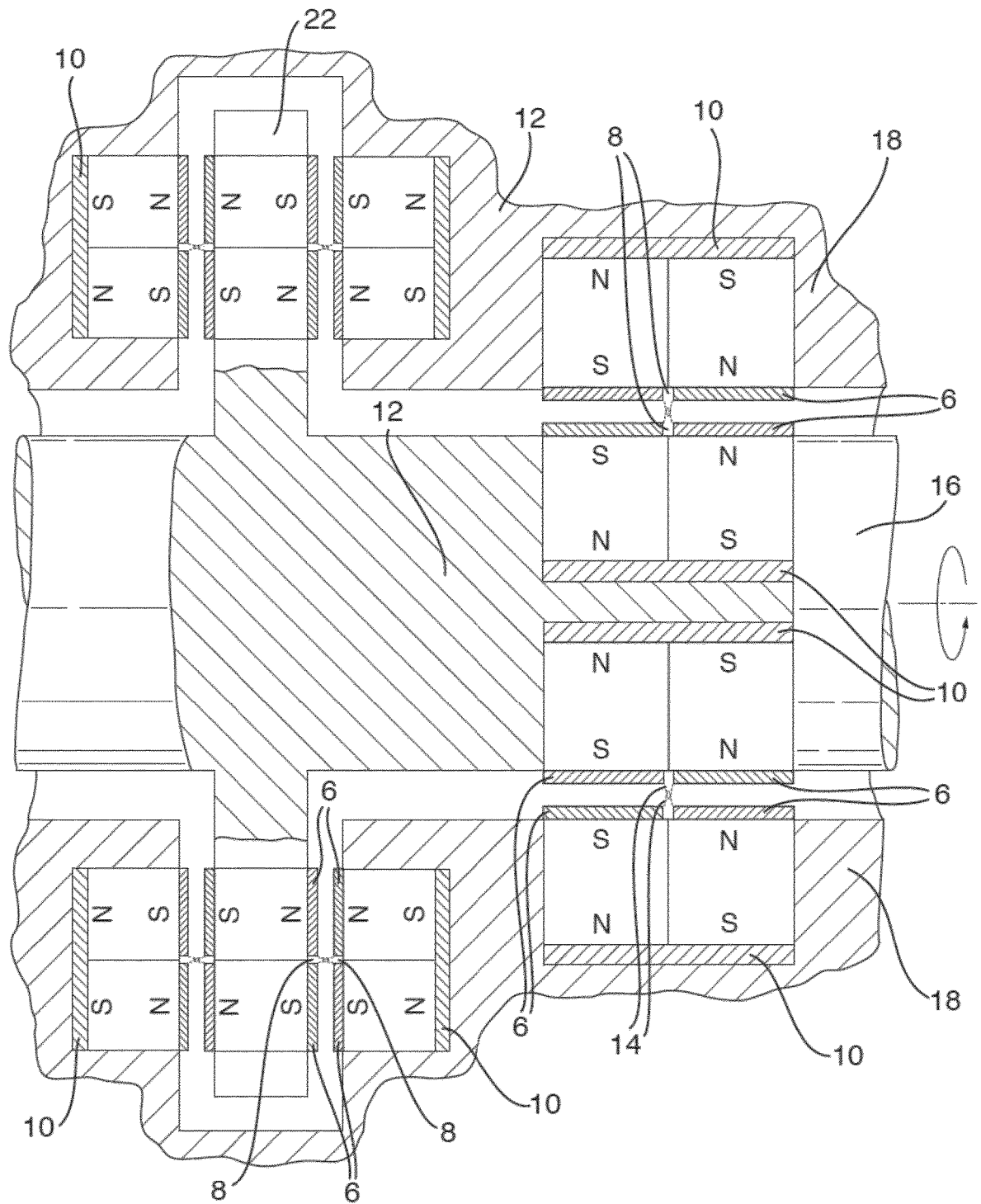
FIG. 7 shows a cross-section of a magnetic journal bearing with a single set of magnet assemblies for radial forces and an additional set of magnet assemblies acting as a thrust bearing for axial forces.

Another example is shown in FIG. 7. In this case the journal bearing, which supports the shaft 16, has only a single pair of magnet apparatuses and these have their centre lines aligned so that the gaps 8 and magnetic fields 14 are directly opposed to one another. The magnet apparatuses have the same features as described above in relation to FIG. 4. By itself this arrangement would not be stable, since any movement away from alignment would lead to a tendency for a continued movement until ultimately the repulsive forces would not be sufficient to support the bearing forces. However, in the FIG. 7 example there is a further magnetic bearing mounted on a flange 22 and acting as a thrust bearing to withstand forces in either axial direction. It will be understood that this could be used alone as a thrust bearing (for example in combination with a ball bearing as the journal bearing) and also that it could be replaced with an alternative bearing type if appropriate.

The thrust bearing on the flange 22 has circular magnets mounted on the flange and forming circular gaps 8 on both sides of the flange 22. Advantageously the same magnets are used for the two sides of the flange. With this arrangement there is no base plate 10, but instead each end of the main permanent magnets has a mask 6 and a gap 8 along the joining line of the magnets. There would typically be a sequence of magnets to form the ring shape about the flange 22. Mounted to the bearing shell 18, in a cavity that encloses the flange 22, are ring shaped magnet apparatuses with circular gaps 8 facing inwardly. The two sets of opposing magnetic field could be aligned or alternatively there may be a small offset. An offset, for example with the magnet apparatus on the flange 22 having a slightly smaller diameter than the magnet apparatus on the bearing shell 18, would give greater stability for the thrust bearing. However it may not be essential to have this in this example since the journal bearing and perhaps also other bearings on the shaft (not shown) will provide radial stability.

Figure 8:
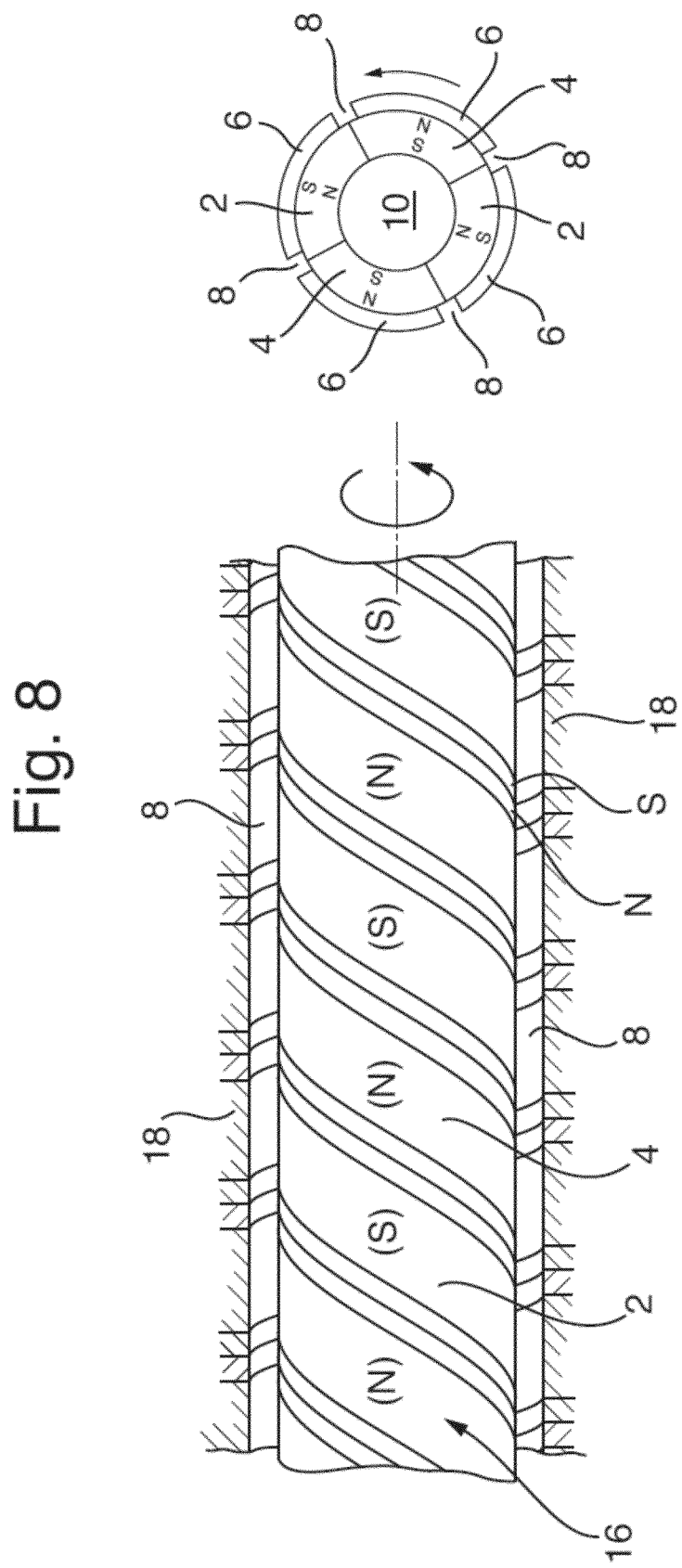
FIG. 8 is an example of a magnetic bearing using spiral shaped magnet assemblies.

An example of bearing surfaces using spiral magnet apparatuses to support a shaft is shown in FIG. 8. The shaft 16 is held within a bearing shell 18 and they are provided with spiral magnet apparatuses with opposite directions of turn. In this example the shaft 16 has two magnet apparatuses coiled around the shaft 16 in a first direction, and the bearing shell will have an equivalent number of magnet apparatuses coiled around the inner surface thereof in the opposite direction. The crossing points where the gaps 8 on the inner and outer magnet apparatuses cross one another will provide the repulsion to hold the bearing forces. In this example, as can be seen from the cross-section through the shaft, whilst there are only four magnets in total it is nonetheless possible to create four gaps 8 since the magnets join to one another on both lateral sides. The common base 10 for the magnets on the shaft 16 is provided by the shaft material. This arrangement will allow for both rotating and sliding movement of the shaft 16. Where only one type of movement should be permitted then an additional bearing or other restraint could be included.

A similar arrangement of a magnet apparatus can be used for various other purposes, for example for separation of particles. The following text describes example geometries that could be utilised for separation of particles, as well as for bearing devices, and other uses.

FIGS. 9 to 12 show examples of magnetic field lines for various possible mask designs. In these examples there are two main permanent magnets 2, 4 as in FIG. 3, with masks 6 either side of a gap 8 that is along the joining line between the two main permanent magnets 2, 4. The apparatus also makes use of an optional yoke 10 that acts as a base for the main permanent magnets 2, 4. The different mask designs were simulated in 2D simulation software PerMag 8 (Field Precision). The masks 6 as well as the main permanent magnets 2, 4 are made of permanent magnet materials such as Nd—Fe—B. Other similar cobalt-iron alloys could be used, or other magnetically retentive alloys such as nickel iron alloys or silicon iron alloys. The yoke 19 may be a material such as Permendur, or Vacoflux 48 as manufactured by VACUUMSCHMELZE GmbH & Co. KG of Germany. Other similar cobalt-iron alloys could be used for the yoke 10, or other magnetically retentive alloys such as nickel iron alloys or silicon iron alloys. In FIGS. 9, 10*a*, 11 and 12 the magnetic material of the masks 6 has an opposite polarity to that of the underlying main permanent magnet 2, 4. In FIGS. 10*b* and 10*c* the magnetic material of the masks 6 has the polarity perpendicular to the main permanent magnets as depicted in FIG. 10*c*, with the two masks 6 having aligned polarities acting to guide the magnetic field produced by the main permanent magnets 2, 4. FIG. 10*c* also shows the direction of the magnetic polarity in the yoke 10. This could be a magnetic field induced in a non-retentive yoke 10, or alternatively the yoke 10 could be made of a permanent magnet material similar the masks 6. It should be noted that the subsequent examples described herein make use of masks 6 with opposite polarity to the main permanent magnets 2, 4, but of course this is not essential and in some cases advantages will be realised by the use of different directions for the polarity of the masks 6.

The force in the horizontal direction (parallel to the magnet surface) is expected to move particles toward the centre of the magnets while the force in the vertical direction (perpendicular to the magnet surface) will drag particles out of samples toward the surface of the magnet. Both of these forces can have an effect when the magnet apparatus is used for separation of particles.

The dimension of the main permanent magnets 2, 4 in these examples were 7 cm×5 cm×1.5 cm. The sample was simulated as a sample container has walls of 1 mm so the diameter of the sample itself is 10 mm.

The effects of different mask types is known, for example as shown in GB 1421078.5 where tests showed clear improvements for the embedded masks 6, the curved masks 6 and the combination of the embedded and curved masks 6. The use of magnets as the mask material increases the field strength but other effects remain the same, so the embedded and curved geometries for permanent magnet masks 6 will have similar improvements compared to non-embedded/straight permanent magnet masks 6. The disclosure of GB 1421078.5 also includes tests for other geometries discussed below, showing advantageous effects for non-retentive masks that will also occur with the permanent magnet masks 6 proposed herein.

Figure 13:
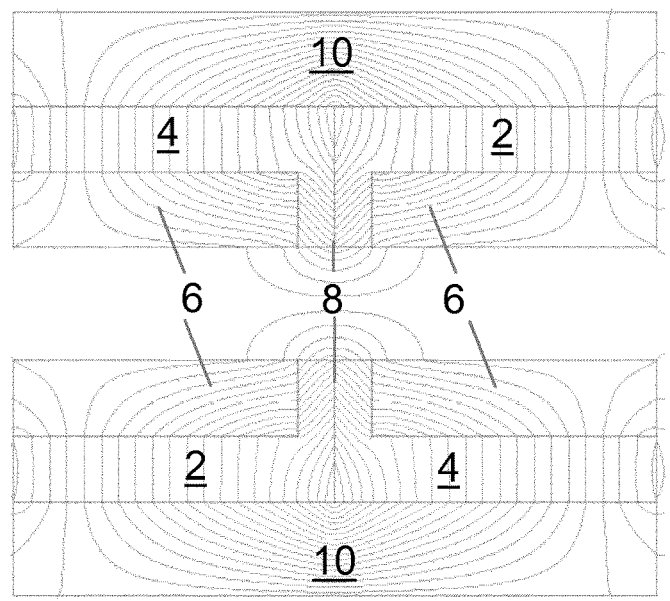
FIGS. 13 to 15 show magnet apparatuses with two magnet pairs as in FIGS. 9, 10 and 11.
Figure 14:
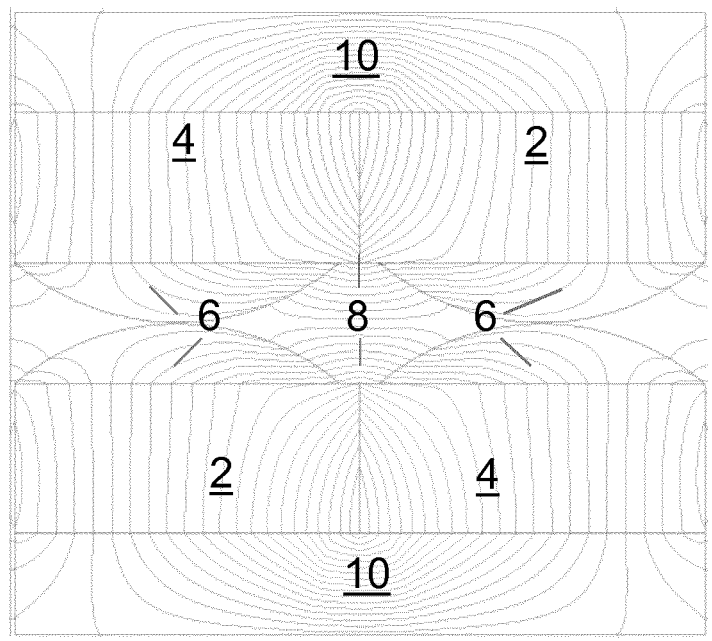
Figure 15:
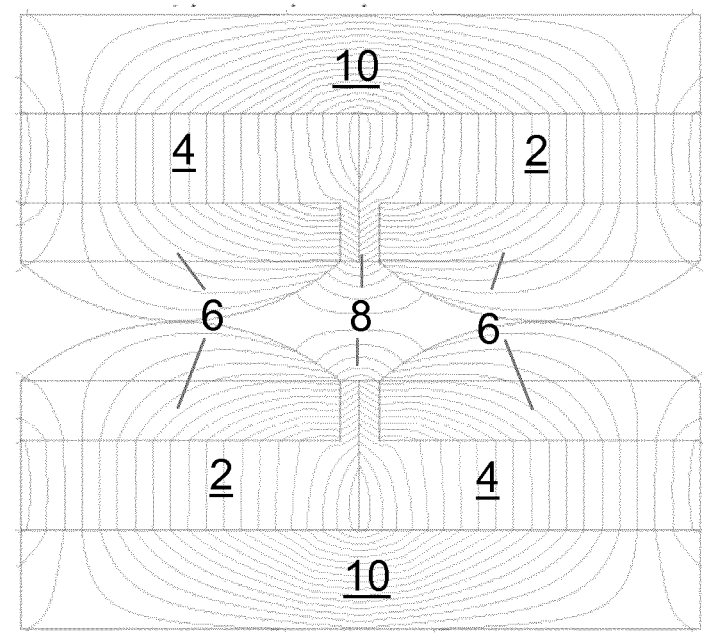

Similar designs for the masks 6 can be used with similar main permanent magnets 2, 4 in double pairs as shown in FIGS. 13 to 15. The embedded masks 6 need to be spaced apart so that there is space between the magnets for the active area, which will for example hold the sample container with particles for separation. The curved masks 6 can be placed in contact with one another with an active area provided due to the shape of the curves as seen in FIGS. 14 and 15.

Figure 16:
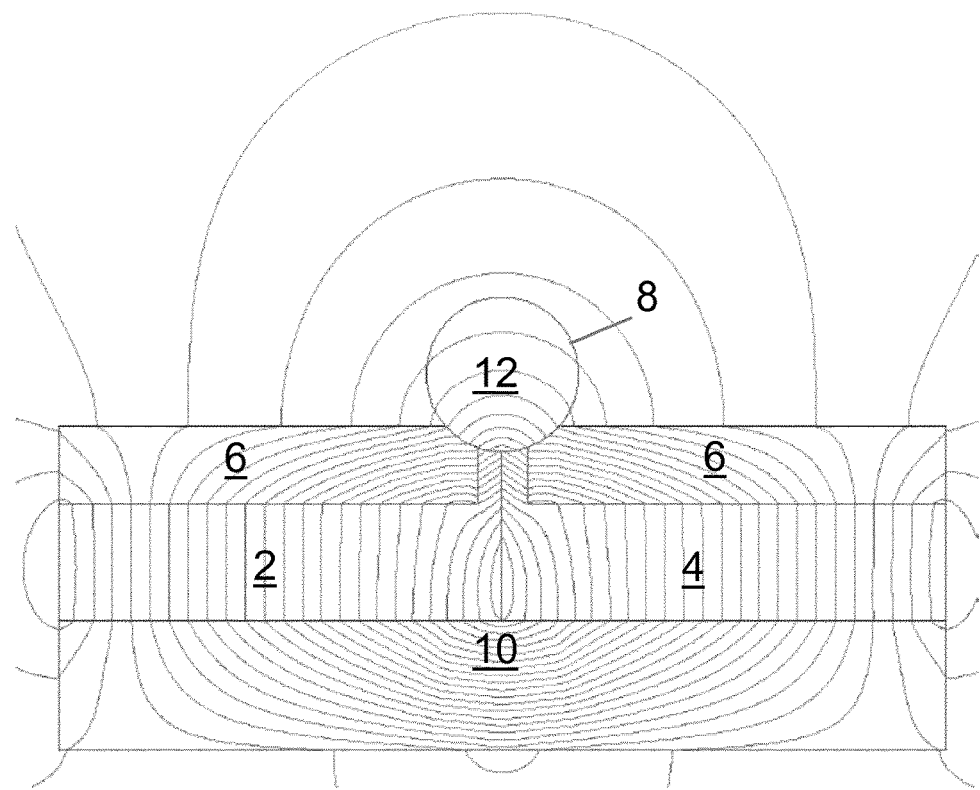
FIG. 16 shows magnetic field lines for a mask with a concave curved recess.
Figure 17:
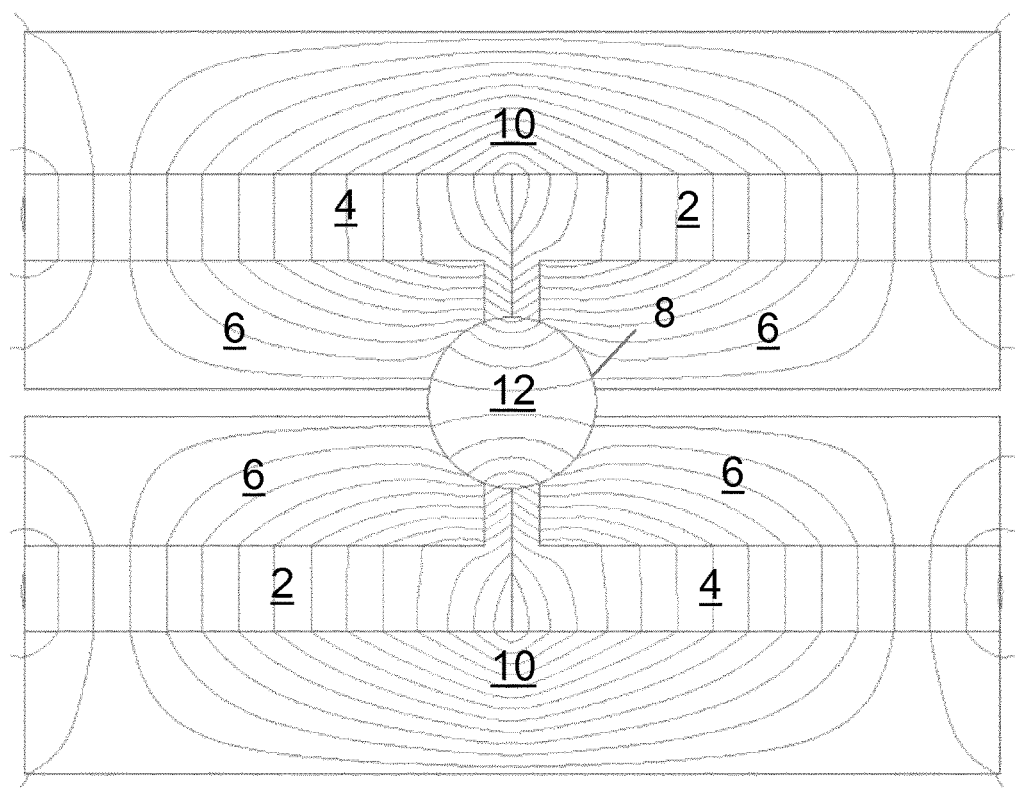
FIG. 17 shows a magnet apparatus with two magnet pairs as in FIG. 16.

Another example arrangement is shown as a single pair in FIG. 16 and as a double pair in FIG. 17. Here the mask 6 has a curved element that forms a recess at the gap 8 for holding a sample container 12, which could be a cylindrical container 12 as shown in cross-section in the Figures. It is important to get the sample as close to the main permanent magnets 2, 4 as possible in order to get a big product of the magnetic field and gradient. One way to do this is a curved magnet 2, 4 that is tailor made to fit a specific sample container 12 as shown. This allows the sample to get close to the main permanent magnets 2, 4. A benefit with this concave curved design is that it allows for a more compact magnet design with a smaller total volume and less of the mask material, which is the most expensive part of the magnets.

Figure 18:
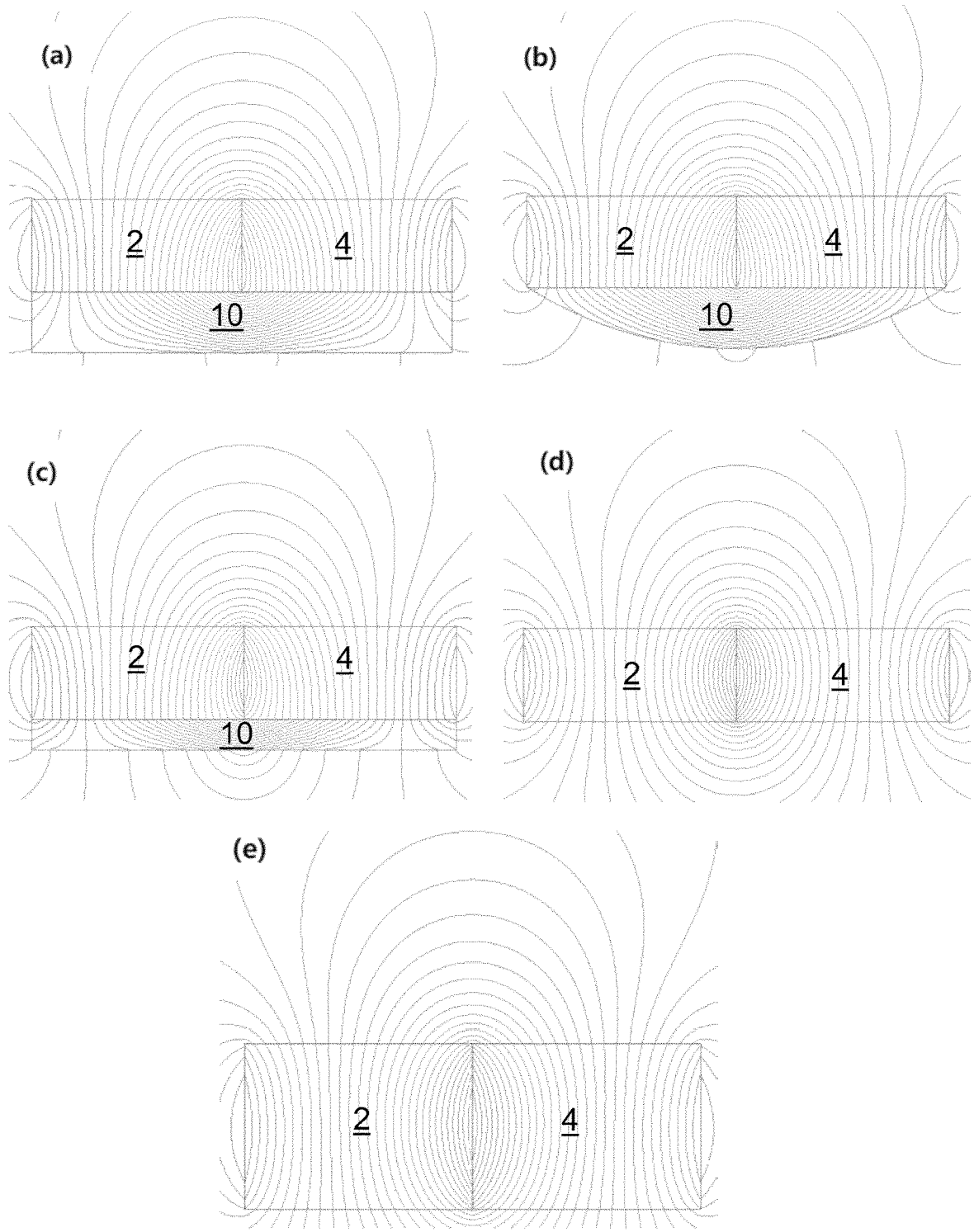
FIGS. 18a to 18e show alternative yoke designs (without masks) as well as the effect of changes in the size of the magnets.

The mask designs discussed above can be used in combination with a yoke 10 at the opposite end of the main permanent magnets 2, 4 and the yoke 10 can have varying designs. FIG. 18 shows (a) large rectangular yoke (b) curved yoke, (c) small rectangular yoke, (d) no yoke and small magnets and (e) no yoke and large magnets. The yoke 10 can provide some useful effects, although it is not crucial to include a yoke 10.

Figure 19:
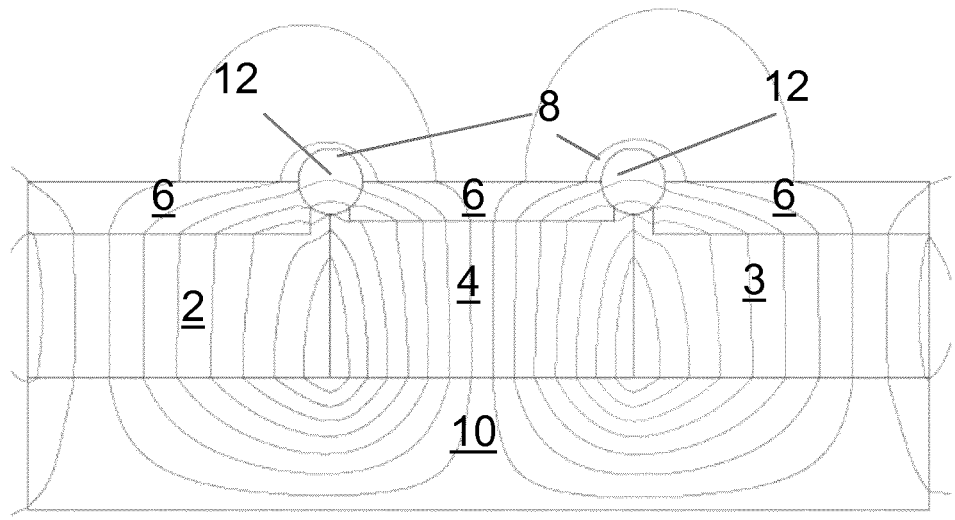
FIG. 19 is an example of a magnet apparatus with three magnets side-by-side.

The magnet apparatus is not limited to just a pair of magnets side-by-side. FIG. 19 shows an example of a magnet apparatus with three magnets side-by-side. In addition to the two main permanent magnets 2, 4 shown in the earlier Figures there is another magnet 3. This forms two gaps 8, which in this example are used to hold two sample containers 12. Further magnets could also be included and of course the mask and magnet geometry can vary, for example using the geometries shown in FIGS. 9 to 12 and optionally including yokes 10 as described above. The magnets 2, 3, 4 have polarities that are opposite for adjacent magnets 2, 3, 4. The use of additional magnets will, for the same total volume, have reduced magnetic force but this is balanced by the addition of a further 'peak' due to the additional gap. It has been found that to generate a roughly symmetrical field about each gap then the mask for the central magnet should be thinner than the other masks, as shown in the Figure. It will be understood that the use of more than two magnets is not limited to only the embedded masks as in the example of FIG. 19, but could also apply to curved masks and so on.

Figure 20:
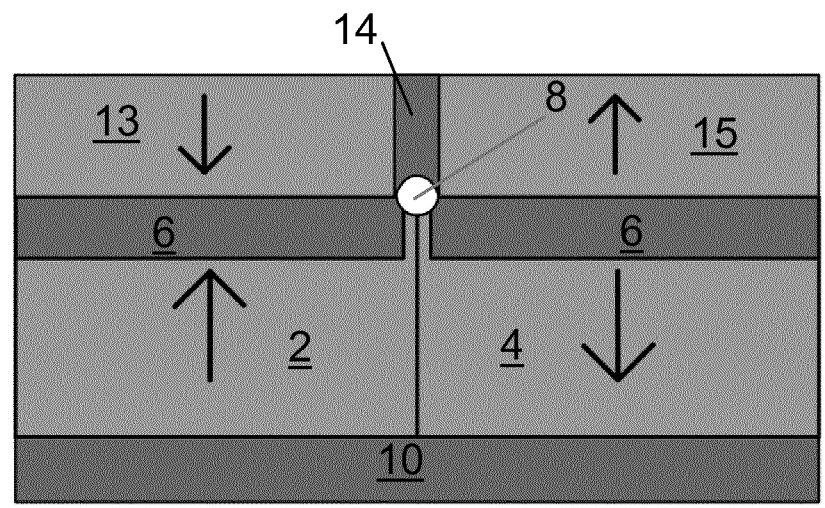
FIG. 20 illustrates the use of added magnets on top of the masks.
Figure 21:
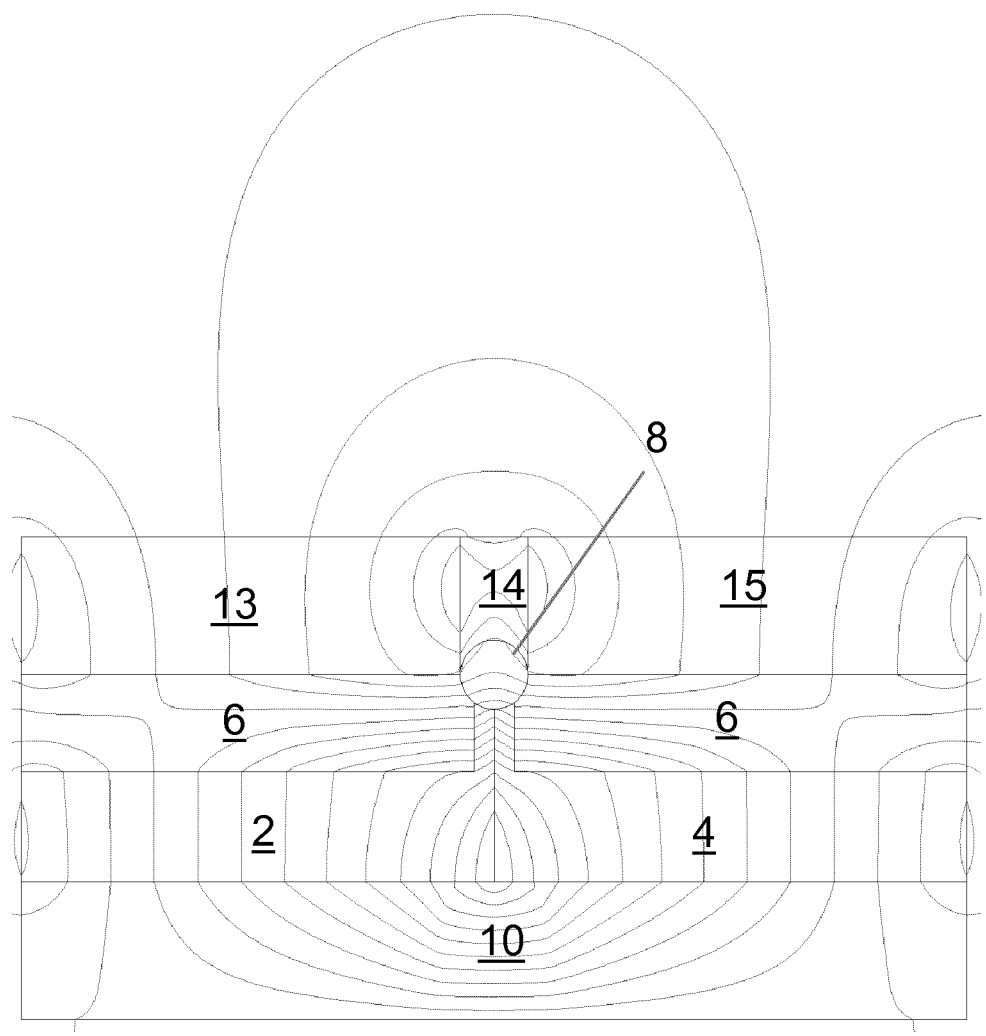
FIG. 21 shows field lines for the apparatus of FIG. 20.

Another adaptation involves the use of added magnets on top of the masks; and this is shown in FIG. 20. The main permanent magnets 2, 4, the magnet masks 6 and the yoke 10 in this example are similar to the example of FIG. 16 and form a space at the gap 8 that is suitable for holding a cylindrical sample container. Additional magnets 13, 15 are placed on top of the masks, and these magnets have opposite polarities to the underlying main permanent magnets 2, 4 as shown by the arrows. In between the two additional magnets 13, 15 there is a further masking element 14 that acts to fully enclose the cylindrical space formed at the gap 8. This may allow for further improvements in the magnetic field. Field lines for the arrangement of FIG. 20 are shown in FIG. 21. The further masking element 14 may be a non-retentive material, or alternatively it could be replaced with a magnetic element, in particular an arrangement of two-magnets placed side-by-side with their respective polarities oppositely oriented to each other and to the adjacent additional magnets 13, 15.

Again it will be understood that although the example of FIGS. 20 and 21 uses an arrangement similar to that of FIG. 16 this is not essential and the magnet and mask geometry could be varied, for example using geometries as shown in FIGS. 9 to 12 or other geometries as discussed above. The shape and size of the additional magnet layers 13, 15 and of the further masking element 14 can be varied according to requirements and to suit the underlying mask and magnet geometry.

Figure 22:
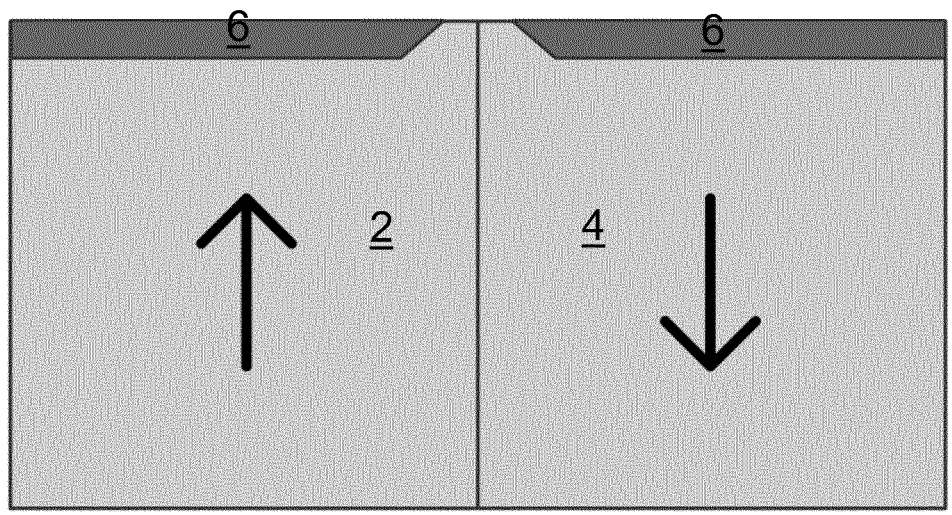
FIG. 22 is a further example for a possible geometry of the masks.

A further example for a possible geometry of the masks is shown in FIG. 22. Here the two magnet masks 6 have a trapezium cross-section, with the short side of the two parallel sides of the trapezium embedded in the permanent main permanent magnets 2, 4 and the long side of the 2 parallel sides forming the exposed surface of the mask. The trapezium has an angled side facing the join between the two main permanent magnets 2, 4 creating a tapered thickness for the masks 6 so that they can be thinner near the join line. This arrangement is found to provide an increased peak in the magnetic field compared to a rectangular mask.

Figure 23:
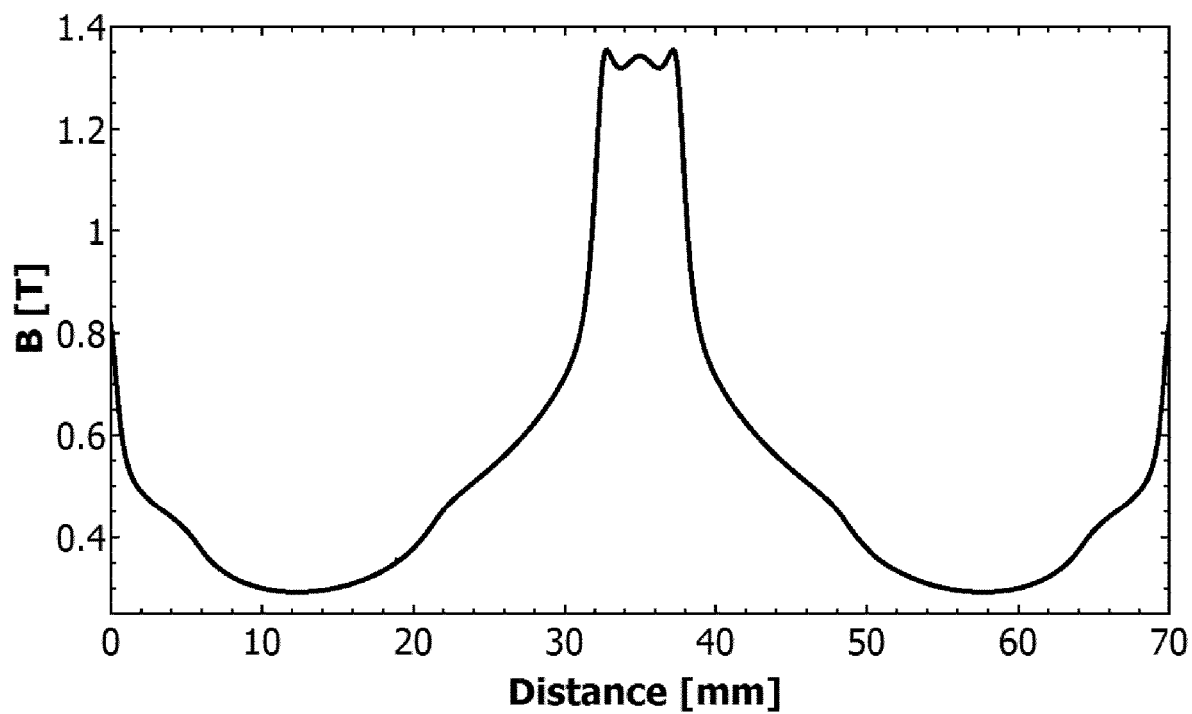
FIGS. 23 and 24 show the magnetic field and gradient of a magnet arrangement similar to that shown in FIG. 4 when using non-retentive masks.
Figure 24:
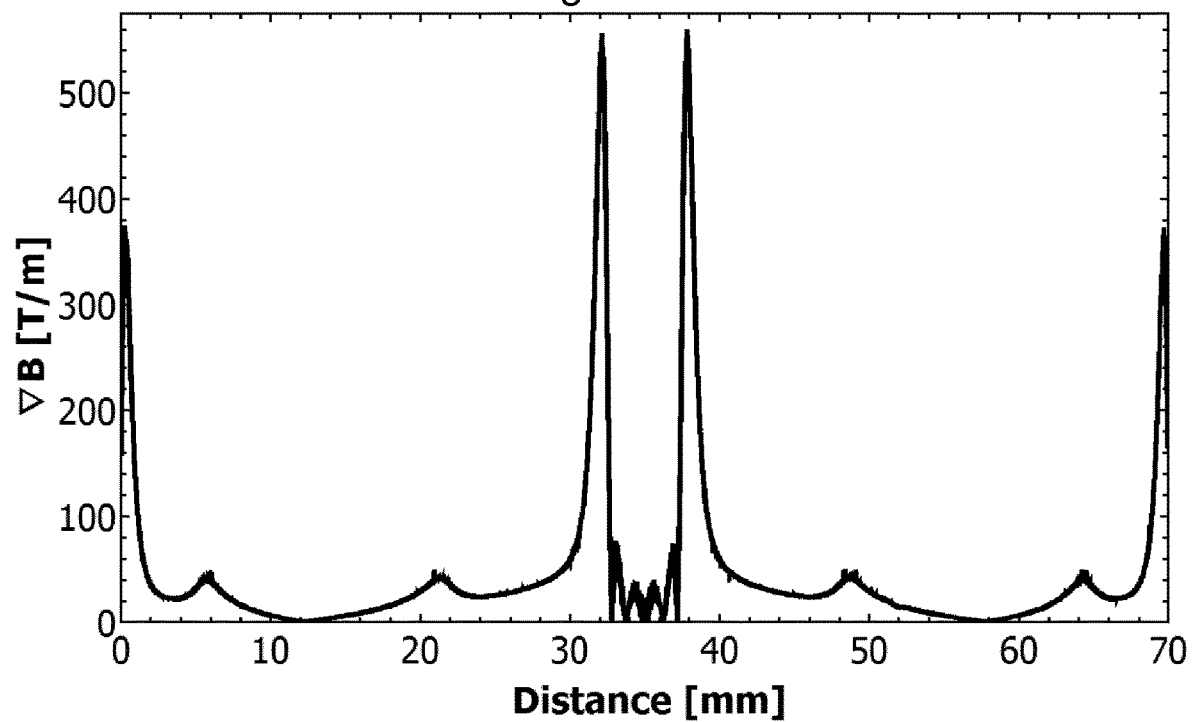
Figure 25:
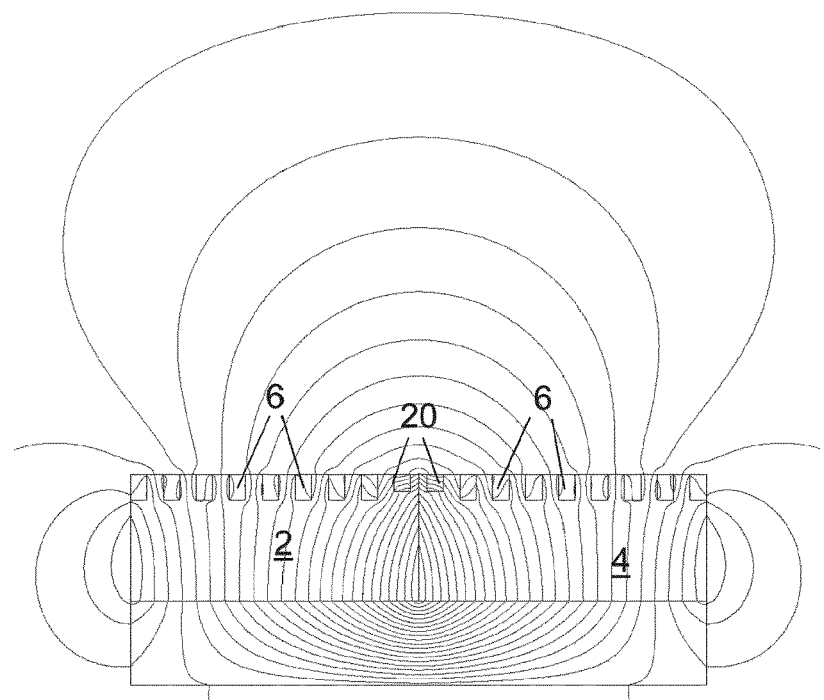
FIG. 25 shows simulated magnetic flux density for an example geometry where two central masks of non-retentive material are flanked by a sequence of additional masks made of permanent magnet material.
Figure 26:
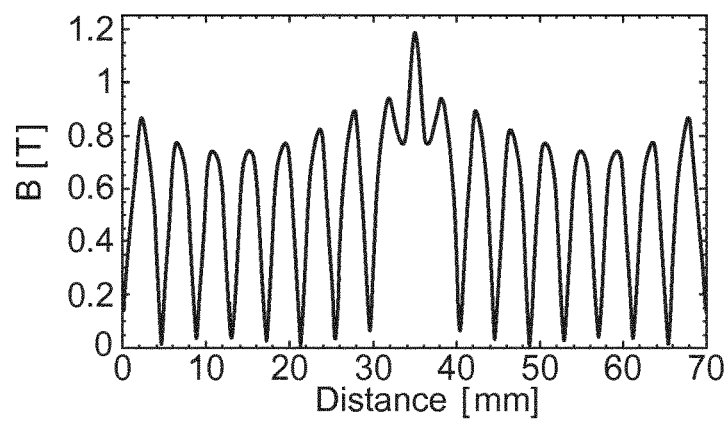
FIGS. 26 and 27 show the magnetic field and gradient of the simulated magnet arrangement of FIG. 25.
Figure 27:
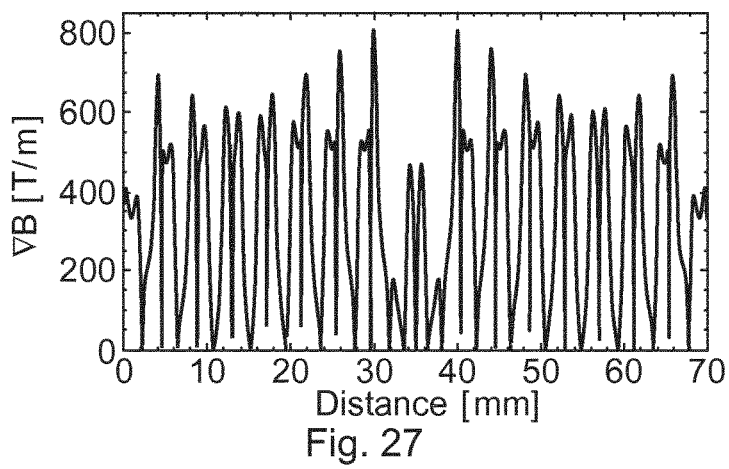
Figure 28:
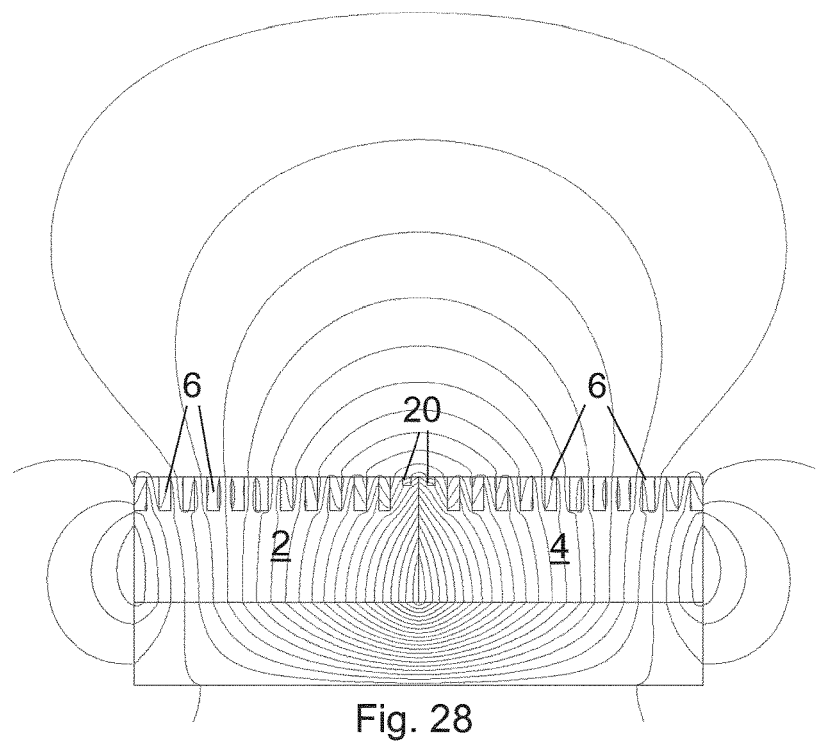
FIG. 28 shows simulated magnetic flux density for an example geometry where two central masks of non-retentive material are flanked by a sequence of additional masks made of permanent magnet material.
Figure 29:
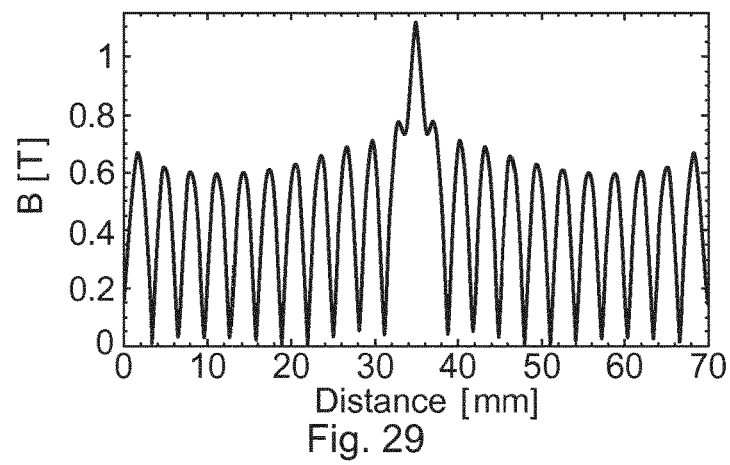
FIGS. 29 and 30 show the magnetic field and gradient of the simulated magnet arrangement of FIG. 54.
Figure 30:
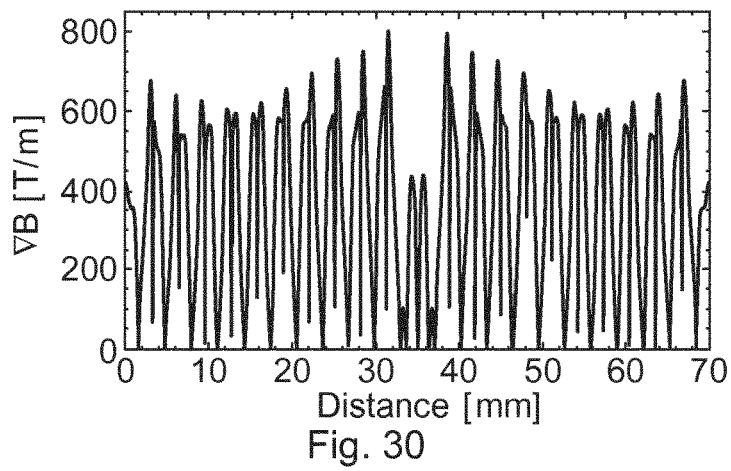

More complex geometries are also possible as shown in FIGS. 25 and 28. In order to provide an indication of the comparative performance of these geometries FIGS. 23 and 24 show the magnetic field and gradient of a magnet arrangement similar to that shown in FIG. 9, using a central pair of non-retentive masks combined with multiple additional masks made of permanent magnet material, whereas FIGS. 26 and 27 show the magnetic field and gradient of the simulated magnet arrangement of FIG. 25; and FIGS. 29 and 30 show the magnetic field and gradient of the simulated magnet arrangement of FIG. 28. The magnetic fields were measured 0.5 mm above the surface of the magnets/masks in COMSOL 4.4. The intention of this type of geometry, using multiple relatively narrow masks is to provide a rapid increase and decrease of the magnetic field rather than guiding it toward the centre of the two main permanent magnets 2, 4.

FIG. 25 shows simulated magnetic flux density for an example geometry where two central masks 20 of non-retentive material are flanked by a sequence of additional masks 6 made of permanent magnet material. A permendur yoke is also present. In this example there are eight additional masks 6 on either side of the two central masks 20 and the central masks 20 have a reduced depth compared to the additional masks 6. The reason for the reduced depth in this example relates to the ease of manufacture of the non-retentive masks 20 and the permanent magnet masks 6 whilst prototyping, and it will be appreciated that similar advantages would arise if all of the masks 20, 6 had the same depth, although of course differing effects could be obtained by varying the depths of not only the central masks 20 but also the additional masks 6, and the widths of the masks 6, 20 could also be varied. The width of the additional masks 6 in this example is approximately 2 mm. The additional masks 6 are made of a permanent magnet material similar to the main permanent magnets 2, 4, with the polarity in the opposite orientation.

The arrangement of FIG. 28 is similar to that of FIG. 25 but with twenty-two small magnet masks 6 instead of sixteen, i.e. eleven magnets either side of the central masks. The additional masks 6 are narrower and deeper than in FIG. 25, with a width of about 1 mm and a depth of about 5 mm.

Figure 9:
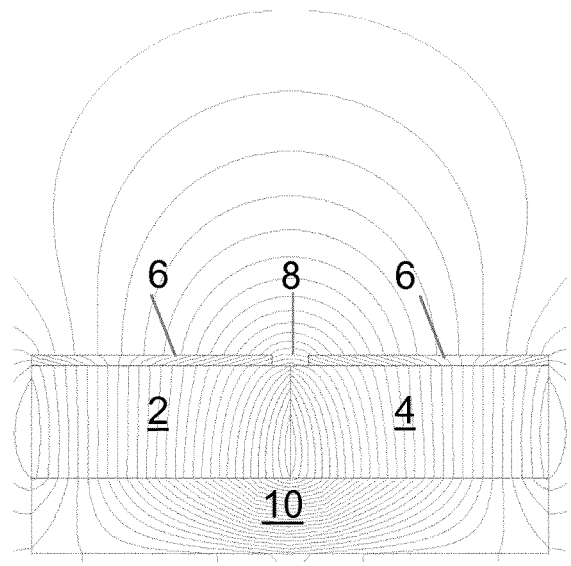
FIG. 9 shows magnetic field lines with a relatively thin mask.

It will be appreciated from comparison of the magnetic field gradients for the various designs that the use of multiple permanent magnet masks either side of the central non-retentive masks produces repeated spikes with a high magnetic field gradient at a level larger than that found for the basic design of FIG. 9. Thus, improvements in the performance of the magnets will be realised where it is useful to have repeated peaks in magnetic field gradient and in magnetic field.

Figure 31:
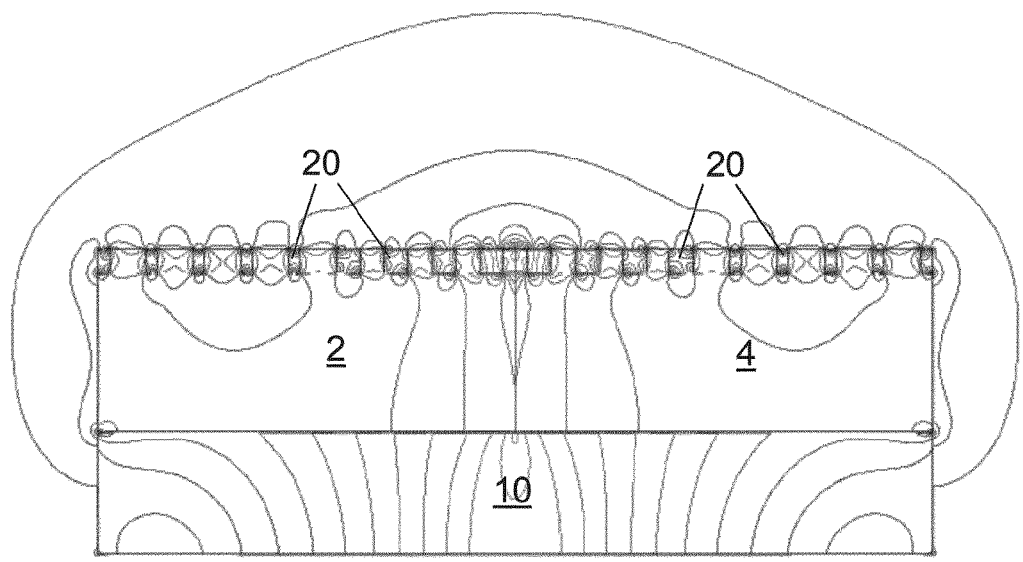
FIG. 31 shows an arrangement using solely non-retentive masks.
Figure 32:
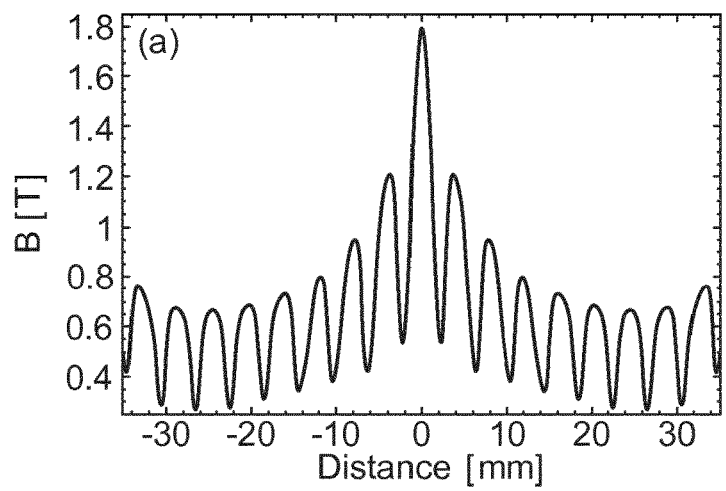
FIGS. 32 and 33 show magnetic field strength and gradient for a simulation of the FIG. 31 arrangement.
Figure 33:
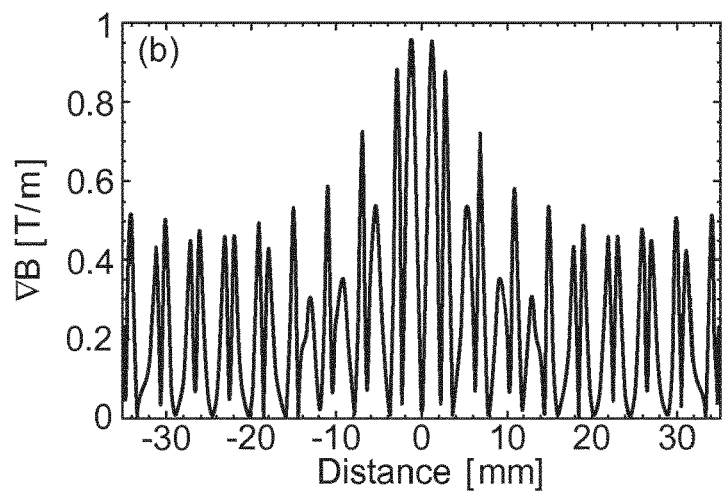
Figure 34:
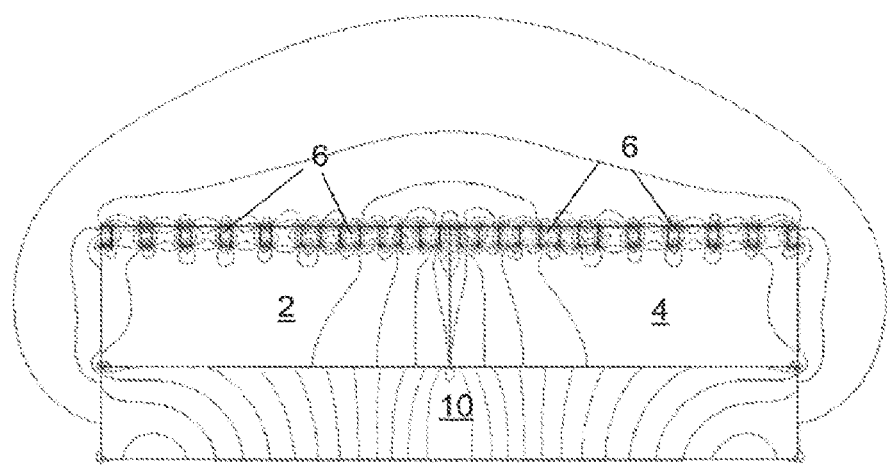
FIG. 34 shows an example with similar geometry to FIG. 31 and using permanent magnet masks.
Figure 35:
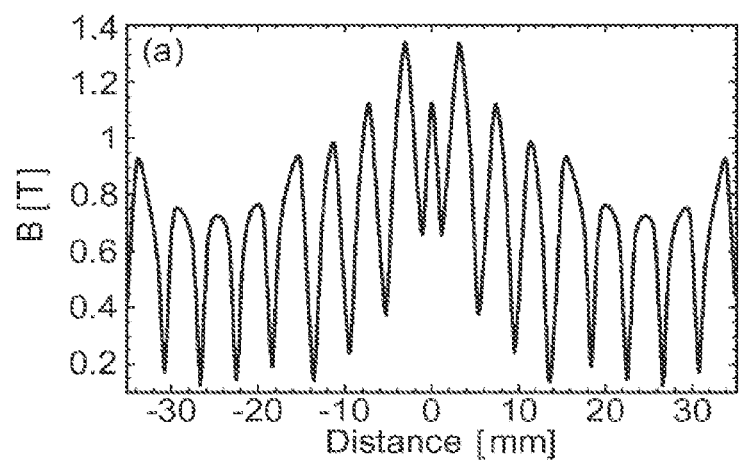
FIGS. 35 and 36 show magnetic field strength and gradient for a simulation of the FIG. 34 arrangement.
Figure 36:
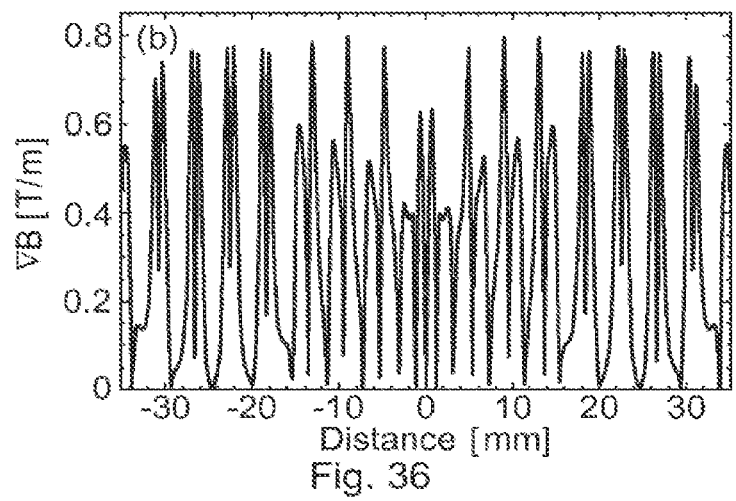

It is envisaged that the central masks may be non-retentive masks 20 as in FIGS. 25 and 28, but also could usefully be replaced by permanent magnet masks 6. Various combinations of permanent magnet masks 6 and non-retentive masks 20 could be used. A comparison of a multiple mask arrangement with only non-retentive masks 20 and the same multiple mask arrangement with only permanent magnets masks 6 is show in FIGS. 31 to 36. FIG. 31 uses multiple masks of differing widths, with each mask 20 being made of a non-retentive material. The two main permanent magnets 2, 4 and the yoke 10 are similar to the examples described above. FIGS. 32 and 33 show the magnetic field strength and the gradient from a simulation of the geometry shown in FIG. 31. FIG. 34 has an identical geometry to FIG. 31, but with the non-retentive masks 20 replaced by permanent magnet masks 6. FIGS. 35 and 36 show plots of the magnetic field strength and the gradient from a simulation of the geometry shown in FIG. 34. It will be appreciated that the permanent magnet masks 6 produce larger magnetic field gradients than the non-retentive masks 20. This has advantages for applications such as separation of particles.

Figure 37:
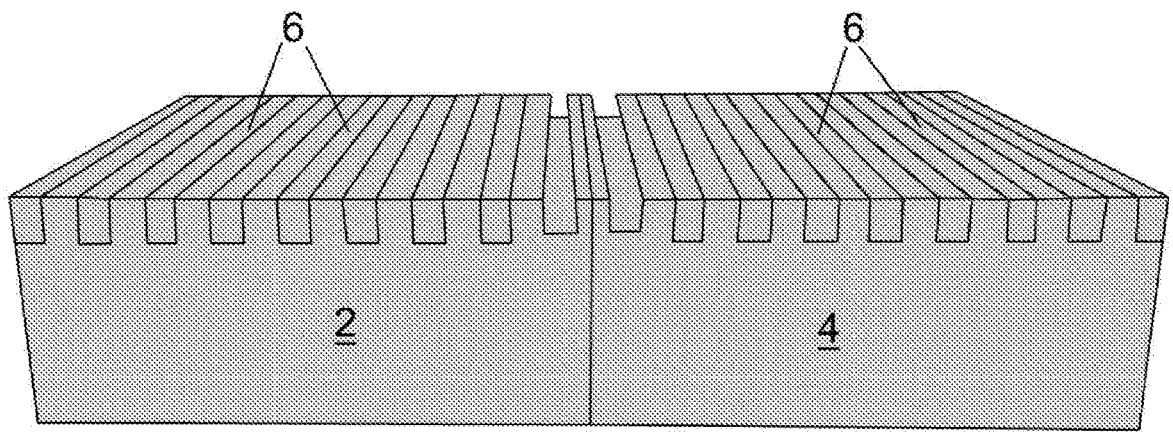
FIGS. 37 and 38 show prototype magnet arrangements similar to the simulated arrangements of FIGS. 25 and 28, aside from the omission of the non-retentive magnets.
Figure 38:
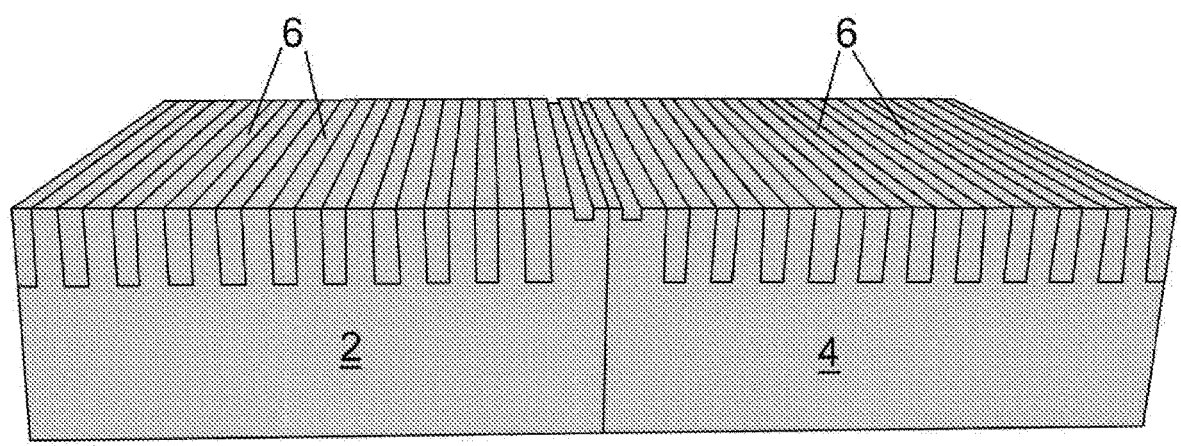

FIGS. 37 and 38 show prototypes that were used to test the performance of the geometries simulated in relation to FIGS. 25 and 28. These prototypes were tested in relation to separation of particles. Separation of particles, and in particular for separation of nanoparticles having differing paramagnetic and/or differing diamagnetic properties, is an important application for the proposed magnet assembly using permanent magnet masks. The magnet apparatus is able to provide an improved separation compared to the prior art devices, for example the device of US 2010/012591. In addition, since the gradient has a significant effect on separation of particles, and as the use of permanent magnet masks can increase the gradient, then improvements are also provided compared to the use of masks made of non-retentive materials.

The force required to drag a magnetic particle out of a medium by a magnet is dependent on the product of the magnetic field B and gradient ∇B as well as on the size of the particle:

$$F_{mag} \propto r^3 \cdot B \nabla B$$

where r is the radius of the particle.

The magnetic force acting on a 1 μm particle is 1000 times higher than for a 100 nm particle since the force is proportional to the cube of the particle's radius. This means that the product of the magnetic field and magnetic gradient B∇B becomes increasingly important as the particle size falls in the nanometer range <100 nm. The improvements described herein allow for this product to be increased compared to the prior art device. The devices described above will therefore be able to separate out considerably smaller nanoparticles than the magnet described in US 2010/0012591. In order to get a large force on the particles one can direct the particles through small microfluidic channels over the magnets, for example channels formed in a cylindrical sample container. Microfluidics allows small volumes of particles in a fluid to be sent over the magnets at low velocities. The particles will be separated out of the fluid and will stick to the walls of the channels closest to the magnet.

In addition, if geometries of the type shown in FIGS. 25, 28, 34, 37, 38, 39 and 40 are used then the repeated peaks in the magnetic field and gradient will allow for improved separation, since in effect there are multiple 'steps' for the particles to pass, and hence multiple opportunities for separating the particles from the fluid. Tests were carried out using the prototypes of FIGS. 37, 38, 39 and 40.

Particles were pumped over the surface of the magnets by a syringe pump. The tube had an inner diameter of 0.3 mm and an outer diameter of 0.76 mm. A MS2G Single Frequency Sensor connected to a MS3 magnetic susceptibility meter (Bartington Instruments) measured the susceptibility of the samples. Two tests were performed using microparticles and using nanoparticles.

The microparticles used were Dynabeads Myone (Thermo Fisher Scientific) with a diameter of 1.05 μm. The particles were in a buffer of distilled water and glycerin. The sample was made by mixing 50 μl of the particles with 1.2 ml distilled water. The pumping speed was 50 ml/hr. The nanoparticles used were fluid MAG-DX (Chemicell) with a diameter of 100 nm. 20 μl of the particles were mixed with 1 ml distilled water. The pumping speed was 10 ml/hr.

The measured susceptibilities of the samples after the separations were compared to the susceptibility of a sample that has not been separated. One can then calculate the amount of particles that have been separated out of the mixture by the magnets. The measured susceptibilities of the different samples of microparticles after the separations are listed in Table 1 with reference to a prior art Open Kittel magnet (as in FIG. 1), a masked 'GIAMAG' magnet as in FIG. 9, a multiple mask solution as in FIG. 37 and a multiple mask arrangement as in FIG. 38. The FIG. 28 arrangement is the most efficient design for separation of microparticles. The measured susceptibility of is negative because most of the paramagnetic particles have been removed and the sample will therefore be diamagnetic. This geometry is more than 5 times more efficient than the basic mask design of FIG. 9. The Open Kittel design is a bit better than the basic mask design of FIG. 9. This is because the force required for separating these particles is not very high. The Open Kittel will have a larger area over the surface of the magnet where the gradient is large enough for the separation of these particles than the basic mask design of FIG. 9.

TABLE 1

| | microparticules | |
|---|---|---|
| Sample | Measured Susceptibility [$10^{-6}$] | Amount Separated [$10^{-6}$] |
| No separation | 45.9 | — |
| Open Kittel | 35.5 | 10.4 |
| GIAMAG | 36.7 | 9.20 |
| FIG. 37 | 9.0 | 36.9 |
| FIG. 38 | −1.7 | 46.7 |

The measured susceptibility of the different samples of nanoparticles after the separations are listed in Table 2 for the same geometries as tested for Table 1. The Pedestrian2 magnet is again the most efficient design. Pedestrian2 is over 3.5 times more efficient than the basic mask design of FIG. 9. The FIG. 9 magnet design is a bit more efficient than the Open Kittel design. The force required to separate these particles are larger than for the microparticles so the masked arrangement provides improvements.

TABLE 2 nanoparticles

| Sample | Measured Susceptibility [10$^{-6}$] | Amount Separated [10$^{-6}$] |
|---|---|---|
| No separation | 1048 | — |
| Open Kittel | 993 | 55 |
| GIAMAG | 979 | 69 |
| FIG. 37 | 830 | 218 |
| FIG. 38 | 799 | 249 |

It is clear from the simulations and the experiments that the designs with multiple narrow masks and using additional masks made of permanent magnets are considerably better at separating particles than the less complex magnet designs. The new designs are less effective than what is predicted by the simulations as in FIGS. 25-30 and 34-36, which is partly due to the fact that the prototypes of FIGS. 37 and 38 were tested without the central masks.

Figure 39:
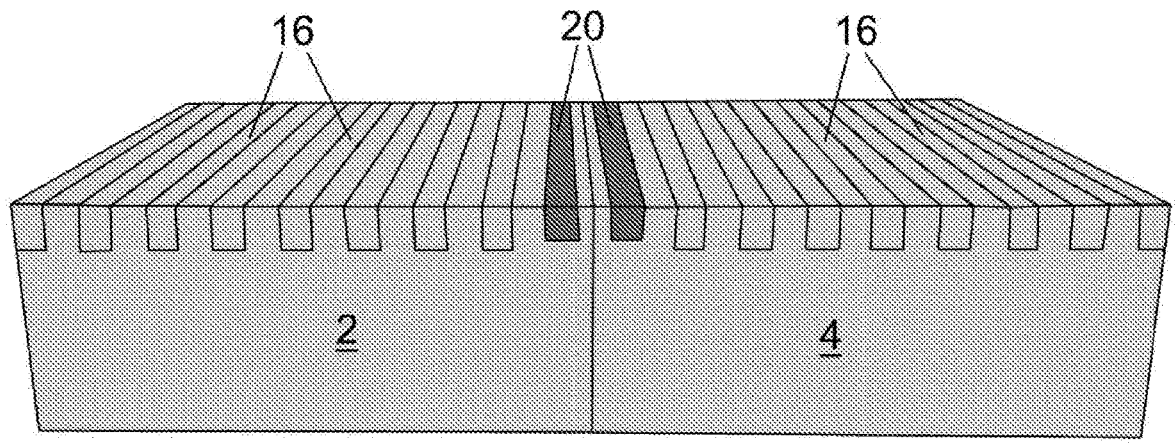
FIGS. 39 and 40 show prototype magnet arrangements identical to the simulated arrangements of FIGS. 25 and 28.
Figure 40:
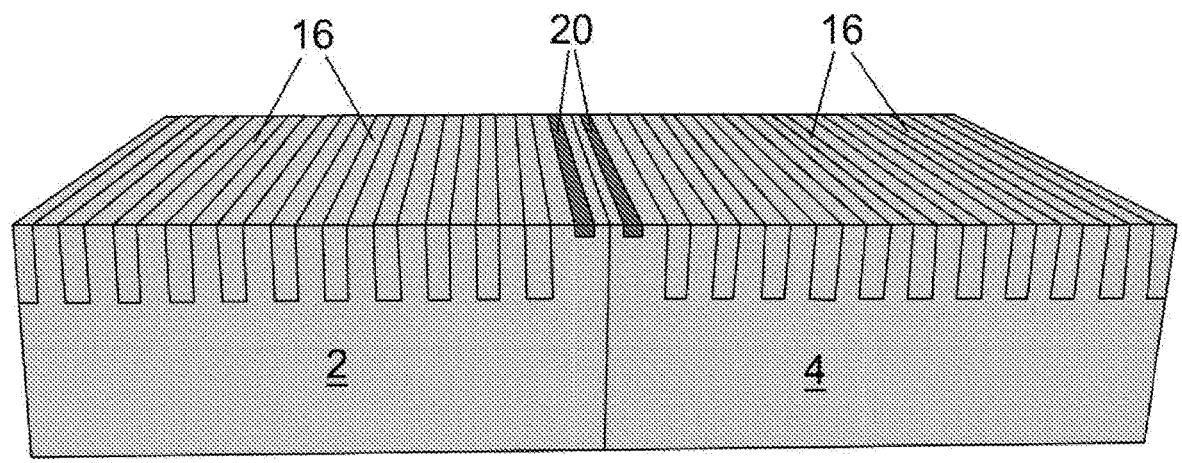

For FIGS. 39 and 40 tests were carried out using similar microparticles and nanoparticles and the same comparative examples were used: a prior art Open Kittel magnet (as in FIG. 1), and a masked 'GIAMAG' magnet (as in FIG. 9). It should be noted that different concentrations and pumping speeds were used compared to the tests above for FIGS. 37 and 38. The results were as follows:

Microparticles
Concentration: 50 µl in 1.2 ml distilled water.
Pumping speed: 75 ml/hr

TABLE 3 microparticles

| Sample | Measured Susceptibility [10$^{-6}$] | Amount Separated [10$^{-6}$] |
|---|---|---|
| No separation | 46.20 | — |
| Open Kittel | 36.13 | 10.07 |
| GIAMAG | 38.38 | 7.82 |
| FIG. 39 | 13.05 | 33.15 |
| FIG. 40 | 22.56 | 23.64 |

Nanoparticles
Concentration: 10 µl in 1 ml distilled water.
Pumping speed: 10 ml/hr

TABLE 4 nanoparticles

| Sample | Measured Susceptibility [10$^{-6}$] | Amount Separated [10$^{-6}$] |
|---|---|---|
| No separation | 506.84 | — |
| Open Kittel | 502.50 | 4.34 |
| GIAMAG | 497.39 | 9.45 |
| FIG. 39 | 472.80 | 34.04 |
| FIG. 40 | 469.12 | 37.72 |

It will be seen that the increase in the effectiveness of the separation follows a similar pattern: the prototypes with multiple magnets perform considerably better for separation than the Open Kittel magnet and the basic masked arrangement of FIG. 4. The FIG. 39 arrangement is best for microparticles and performs around 3.5 times better than the basic FIG. 4 arrangement. The FIG. 40 arrangement is best for nanoparticles and performs about four times better than the basic FIG. 4 arrangement. For the microparticles compared to the nanoparticles, and comparing the Open Kittel magnet and the basic masked arrangement of FIG. 4, the same effect is seen again—the masking slightly reduces the effectiveness for microparticles, but it increases the effectiveness when separating nanoparticles.

Figure 41:
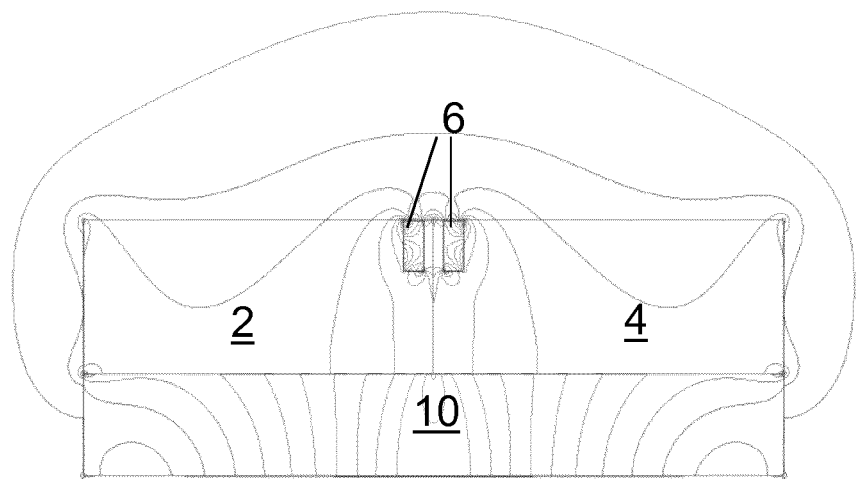
FIG. 41 shows magnet field lines for another example geometry using two narrow central masks with 5 mm depth and no additional masks.

Another variation on the geometry is shown in FIG. 41. Here the width of the masks in cross-section is reduced. It is considered that the shorter masks will disrupt the magnetic field rather than guide it in comparison to longer masks as shown for example in FIGS. 9-12 and so on. Further simulations using this arrangement found that the mask depth that produces the largest magnetic gradients is a thickness of 2 mm.

Figure 42:
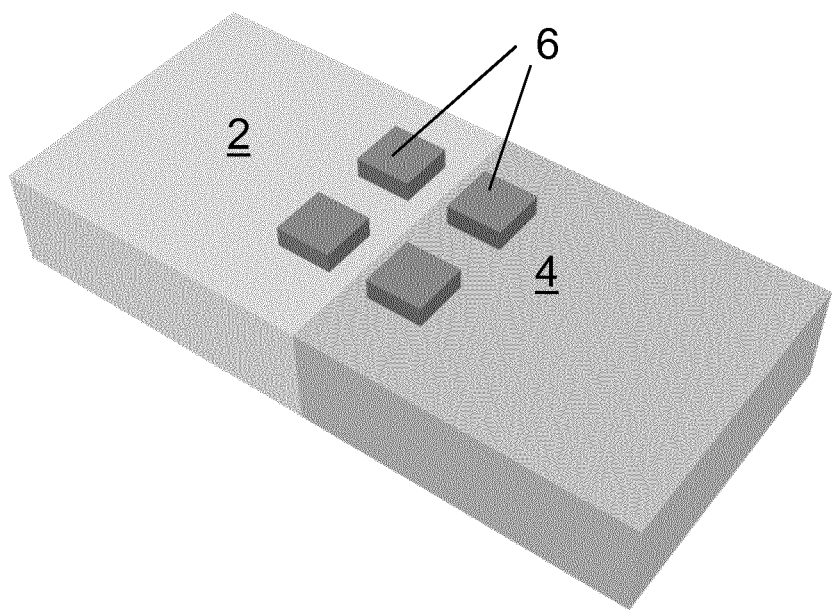
FIG. 42 shows another example geometry using an array of square masks.

FIG. 42 shows another example geometry using an array of square masks. This type of arrangement could be adapted to have masks of any shape, and any number of masks. In these examples the masks are all adjacent to the joining line, but it would also be possible to have additional masks spaced apart from the joining line and on the other side of the central masks, for example to have additional masks to those shown in FIGS. 37 to 40, but in a grid pattern rather than as a series of strips.

Figure 43:
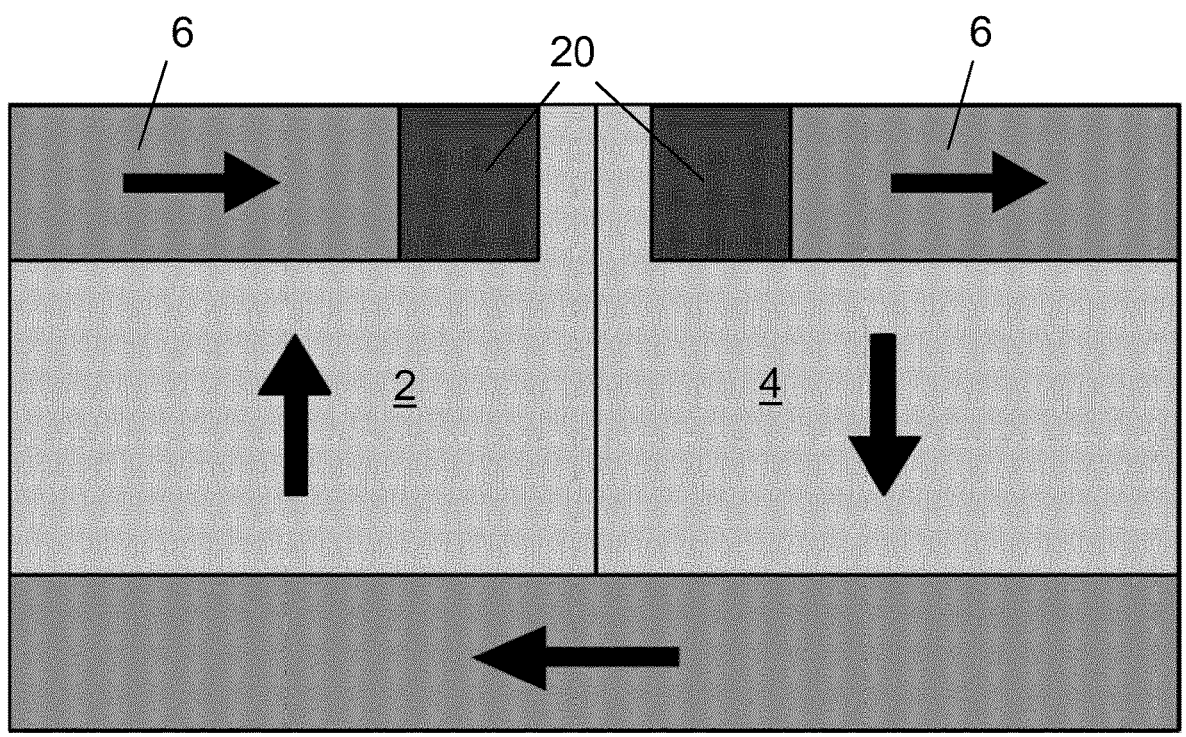
FIG. 43 illustrates a further geometry where non-retentive masks are used in combination with permanent magnet masks.

FIG. 43 shows a further possibility, where magnet masks 6 with polarities perpendicular to the polarity of the underlying magnets 2, 4 (similar to FIG. 10c) are combined with non-retentive masks 20 at the centre.

Any of the geometries described herein could be used with two sets of magnets in face-to-face arrangement as in FIGS. 13-15 for example. Thus, the geometries with multiple masks as in FIG. 25 and so on could be used in such an arrangement.

The invention claimed is:

1. A magnet apparatus for generating at least one of the group consisting of a high gradient and a high strength magnetic field, the magnet apparatus comprising:
    two main permanent magnets located side-by-side with oppositely oriented magnetic field polarities and end surfaces of opposite polarities next to one another, the magnetic anisotropy of the magnets exceeds the magnetic induction of the material of the magnets; and
    at least one mask on a first end of each of the adjacent permanent magnets, the masks comprising a permanent magnet material covering adjacent end surfaces of the two permanent magnets with a gap in the masks along a joining line between the two permanent magnets to form a zone of high-gradient magnetic field above the joining line; and
    the permanent magnet material of each mask is oriented with the permanent magnet material of each mask's polarity out of alignment with the polarity of the main permanent magnets that the permanent magnet material of each mask is attached to.

2. The magnet apparatus of claim 1, wherein the polarity of the magnet masks is at least 10° out of alignment with the polarity of the main permanent magnets.

3. The magnet apparatus of claim 1, wherein the magnet masks have the polarity of the magnet masks in opposite orientation to the polarity of the main permanent magnets or within 30° of the opposite orientation.

4. The magnet apparatus of claim 1, wherein the polarity of the magnet masks is in a perpendicular direction to the polarity of the permanent magnet masks or within 30° of perpendicular.

5. The magnet apparatus of claim 1, wherein the masks have a maximum thickness greater than a tenth of the thickness of the respective magnet.

6. The magnet apparatus of claim 1, wherein the masks are embedded within the main permanent magnets and the masks have varying thickness.

7. The magnet apparatus of claim 6, wherein the mask has an exposed surface and the magnet has an exposed end surface and an edge, at least one of the group consisting of the varying thickness and embedding of the mask is utilized such that the exposed surface of the mask meets and intersects with the exposed end surface of the magnet at the edge of the mask adjacent to the gap.

8. The magnet apparatus of claim 1, wherein the angle between a tangent to the mask and a tangent to the magnet at a meeting point of the tangent to the mask and the tangent to the magnet is less than 60 degrees.

9. The magnet apparatus of claim 1, wherein the masks each have a maximum thickness that is greater than the width of the gap.

10. The magnet apparatus of claim 1, wherein the thickness of the masks is less than five times the width of the gap.

11. The magnet apparatus of claim 1, wherein the thickness of each of the masks is greater than a fifth of the thickness of the main permanent magnets.

12. The magnet apparatus of claim 1, wherein the gap width is greater than a tenth of the thickness of the main permanent magnets.

13. The magnet apparatus of claim 1, wherein the mask is at least 0.5 mm thick and the gap is at least 0.5 mm thick.

14. The magnet apparatus of claim 1, wherein each of the masks, or a part of each of the masks, has a rectangular cross-section embedded in a recess of a cross-section in each of the main permanent magnets.

15. The magnet apparatus of claim 1, wherein each of the masks has a rounded exposed surface.

16. The magnet apparatus of claim 1, wherein each of the masks has a curved cut-out section adjacent the gap.

17. The magnet apparatus of claim 1, wherein at least one of the permanent magnets has a first end, at least one of the masks on the first end of at least one of the permanent magnets forming two central magnet masks, along with additional masks beside each of the two central masks, the additional masks being further from the joining line and spaced apart from the two central masks along the end surfaces of the main permanent magnets.

18. The magnet apparatus of claim 17, wherein the additional masks are made of a permanent magnet material oriented with opposite polarity to the main permanent magnets.

19. The magnet apparatus of claim 17, wherein the additional masks are at least one of the group consisting of embedded within the two main permanent magnets and have a varying thickness.

20. The magnet apparatus of claim 17, wherein the additional masks each have the same size and geometry.

21. The magnet apparatus of claim 17, wherein some or all of the additional masks have the same size and geometry as the two central masks.

22. The magnet apparatus of claim 1, wherein the orientation of each of the magnets is varied relative to a container with particles to be separated.

23. The magnet apparatus of claim 22, further comprising a rotating wheel allowing for the magnets and masks to be rotated in-plane relative to the working element.

24. The magnet apparatus of claim 1, further comprising a first set of magnets, with masks, as well as a second set of magnets, with masks, the first set of magnets and the second set of magnets facing each other.

25. An apparatus for separation of particles of differing types having different at least one of the group consisting of paramagnetic and diamagnetic properties, the apparatus comprising a magnet apparatus as claimed in claim 1.

26. A magnetic bearing comprising:
first and second bearing surfaces; and
at least one magnet apparatus as claimed in claim 1 on the first and the second bearing surfaces, wherein the magnet apparatus on the first bearing surface provides a magnetic field opposed to the magnetic field of the magnet apparatus on the second bearing surface.

27. A method of generating at least one of the group consisting of a high gradient and high strength magnetic field, providing an apparatus as claimed in claim 1.

28. A method for the separation of more than one particle comprising:
using an apparatus claimed in claim 1; and
exposing the each of the at least more than one particle to be separated to the magnetic field generated by the apparatus.

* * * * *